United States Patent
Hong et al.

(10) Patent No.: US 10,964,048 B2
(45) Date of Patent: Mar. 30, 2021

(54) METHOD AND DEVICE FOR GENERATING IMAGE FOR INDICATING OBJECT ON PERIPHERY OF VEHICLE

(71) Applicant: Samsung Electronics Co., Ltd., Gyeonggi-do (KR)

(72) Inventors: Hyun-seok Hong, Gyeonggi-do (KR); Tae-gyu Lim, Seoul (KR); Sahng-gyu Park, Gyeonggi-do (KR); Yeong-rok Lee, Gyeonggi-do (KR); Seung-hoon Han, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/479,352

(22) PCT Filed: Nov. 27, 2017

(86) PCT No.: PCT/KR2017/013583
§ 371 (c)(1),
(2) Date: Jul. 19, 2019

(87) PCT Pub. No.: WO2018/135745
PCT Pub. Date: Jul. 26, 2018

(65) Prior Publication Data
US 2019/0385334 A1    Dec. 19, 2019

(30) Foreign Application Priority Data

Jan. 23, 2017  (KR) .................. 10-2017-0010677

(51) Int. Cl.
*G06T 7/70*      (2017.01)
*G01S 17/08*    (2006.01)
*G08G 1/16*     (2006.01)

(52) U.S. Cl.
CPC ............... *G06T 7/70* (2017.01); *G01S 17/08* (2013.01); *G08G 1/166* (2013.01); *B60K 2370/1531* (2019.05)

(58) Field of Classification Search
CPC . G06T 7/70; G06T 3/0012; G06T 7/11; G06T 11/00; G01S 17/08; G08G 1/166; B60K 2370/1531
See application file for complete search history.

(56) References Cited

U.S. PATENT DOCUMENTS

| | | | |
|---|---|---|---|
| 9,013,286 B2 | 4/2015 | Chen et al. | |
| 2014/0152774 A1 | 6/2014 | Wakabayashi et al. | |

(Continued)

FOREIGN PATENT DOCUMENTS

| | | |
|---|---|---|
| KR | 1020150011629 | 2/2015 |
| KR | 1020160060736 | 5/2016 |

(Continued)

OTHER PUBLICATIONS

European Search Report dated Oct. 23, 2019 issued in counterpart application No. 17892884.2-1210, 8 pages.

(Continued)

*Primary Examiner* — Yogesh K Aggarwal
(74) *Attorney, Agent, or Firm* — The Farrell Law Firm, P.C.

(57) ABSTRACT

Provided is an apparatus for generating an image, the apparatus including a processor configured to detect at least one object near a vehicle by using a result of sensing a surrounding area of the vehicle, determine a direction and a distance from the vehicle to the detected at least one object, and generate an image of the surrounding area of the vehicle based on the determined direction and distance. Therefore, the apparatus may accurately express a shape of the object and a relative location between the vehicle and the object on (Continued)

a three-dimensional (3D) image of the surrounding area of a vehicle.

13 Claims, 22 Drawing Sheets

(56) References Cited

U.S. PATENT DOCUMENTS

| | | | |
|---|---|---|---|
| 2015/0084755 A1* | 3/2015 | Chen | B60R 1/00 340/435 |
| 2015/0278611 A1 | 10/2015 | Chi et al. | |
| 2016/0159281 A1 | 6/2016 | Jang et al. | |
| 2016/0221503 A1 | 8/2016 | Krokel et al. | |
| 2017/0195564 A1* | 7/2017 | Appia | H04N 9/045 |

FOREIGN PATENT DOCUMENTS

| | | |
|---|---|---|
| KR | 1020160074108 | 6/2016 |
| WO | WO 2016/195647 | 12/2016 |

OTHER PUBLICATIONS

International Search Report dated Mar. 5, 2018 issued in counterpart application No. PCT/KR2017/013583, 23 pages.

* cited by examiner

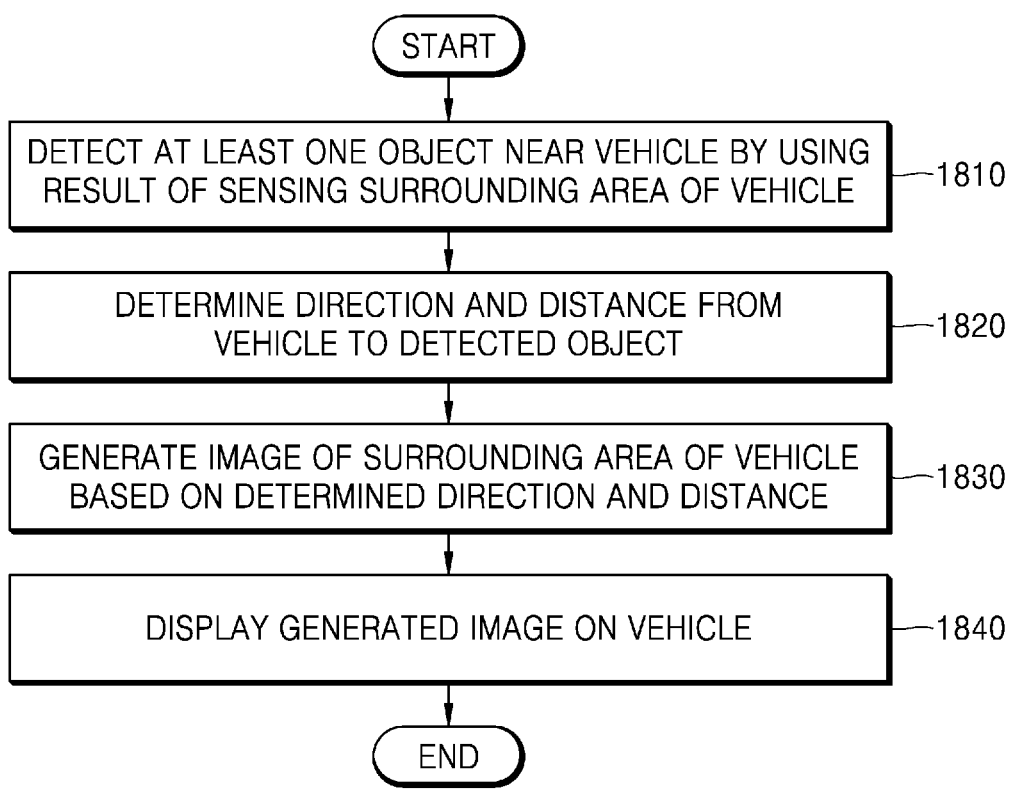

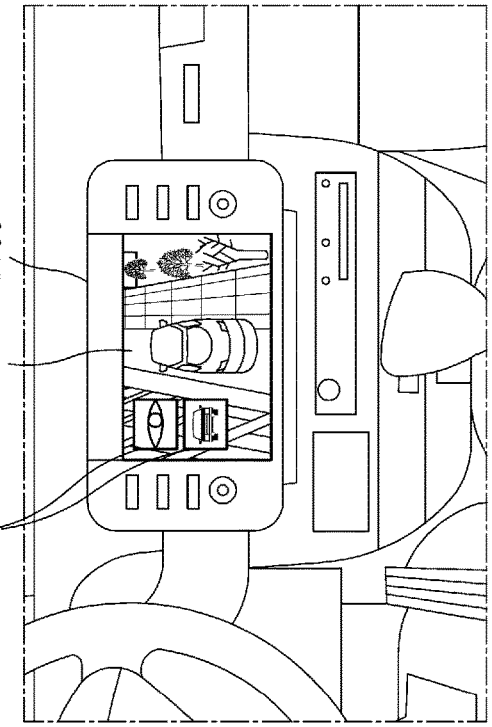
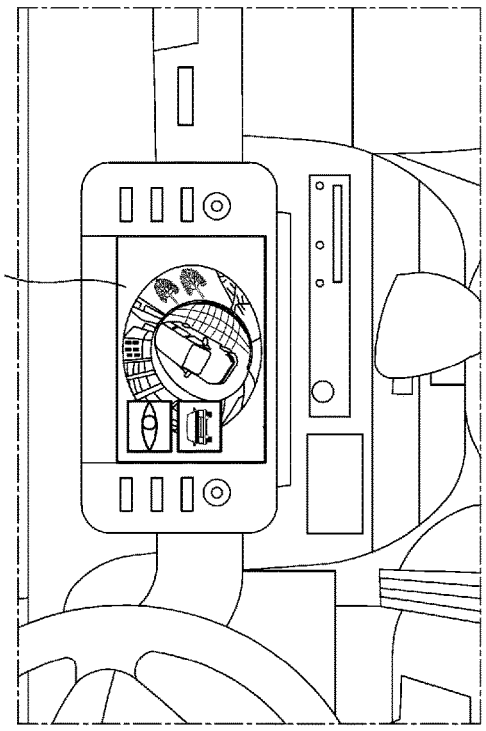
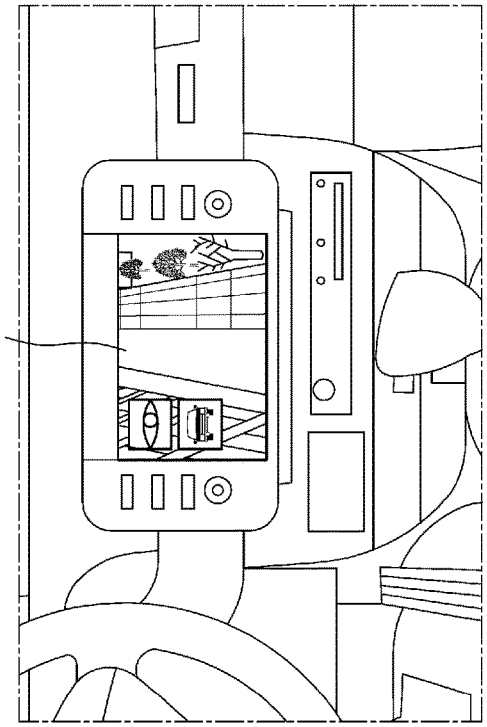
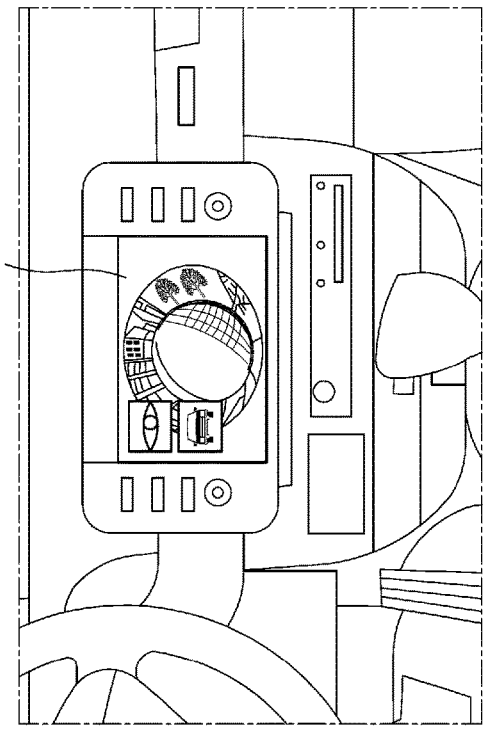

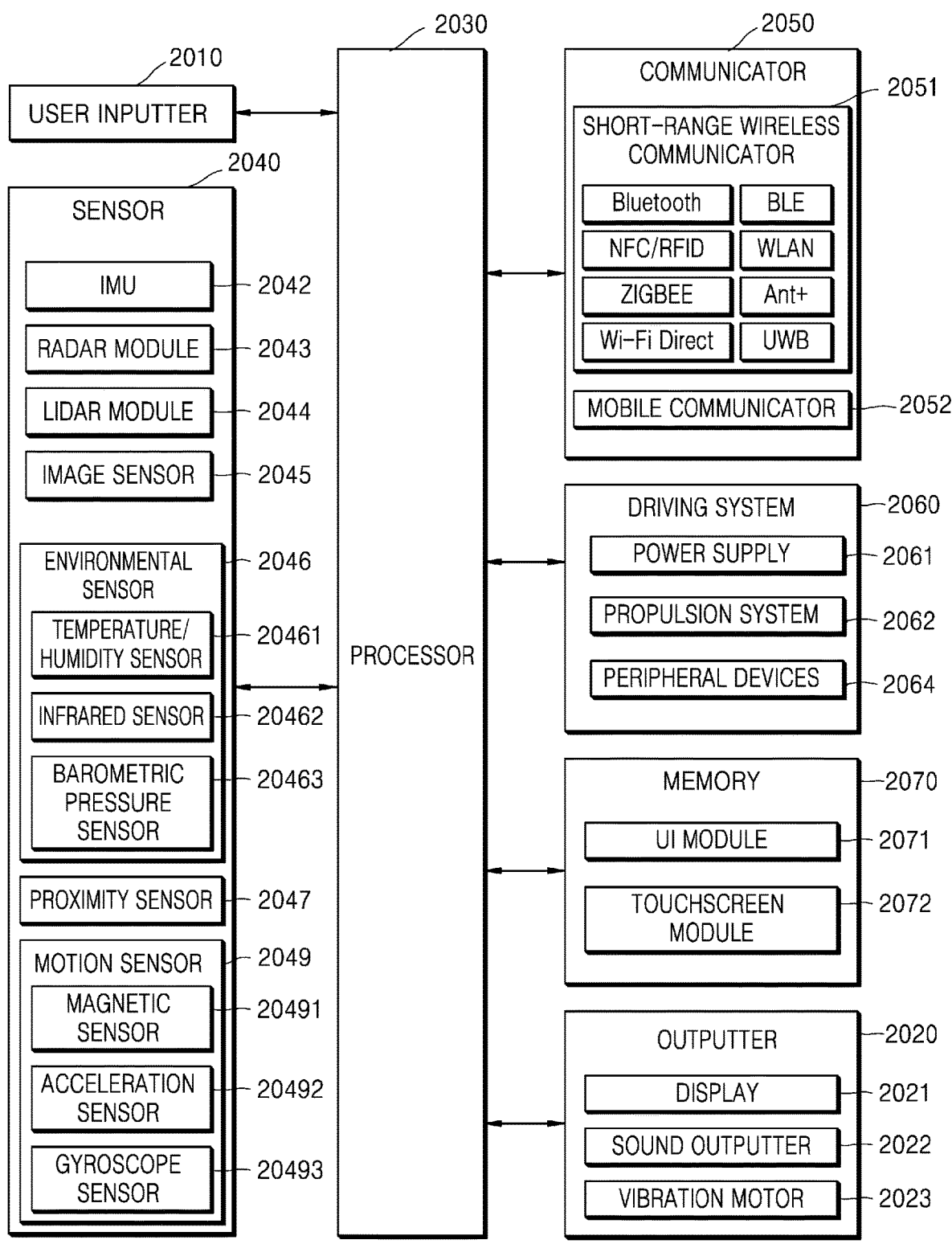

METHOD AND DEVICE FOR GENERATING IMAGE FOR INDICATING OBJECT ON PERIPHERY OF VEHICLE

PRIORITY

This application is a National Phase Entry of PCT International Application No. PCT/KR2017/013583 which was filed on Nov. 27, 2017, and claims priority to Korean Patent Application No. 10-2017-0010677, which was filed on Jan. 23, 2017, the content of each of which is incorporated herein by reference.

TECHNICAL FIELD

The present disclosure relates to a method and apparatus for generating an image of objects near a vehicle.

BACKGROUND ART

Due to the development of technologies applied to vehicles, various methods of displaying information related to driving of a vehicle, on a window of the vehicle or the like are being developed.

In some cases, a driver and a passenger in the vehicle may not accurately identify, for example, a pedestrian, a building, or another vehicle near the vehicle due to a limited viewing angle. In this regard, a technology for displaying an image accurately expressing locations and shapes of objects near a vehicle, on a display device of the vehicle is increasingly demanded.

DESCRIPTION OF EMBODIMENTS

Technical Problem

Provided are a method and apparatus for generating an image of objects near a vehicle. Provided is a computer-readable recording medium having recorded thereon a program for executing the method on a computer. Additional aspects will be set forth in part in the description which follows and, in part, will be apparent from the description, or may be learned by practice of the presented embodiments of the disclosure.

Solution to Problem

According to an aspect of the present disclosure, an apparatus for generating an image includes a processor configured to detect at least one object near a vehicle by using a result of sensing a surrounding area of the vehicle, determine a direction and a distance from the vehicle to the detected at least one object, and generate an image of the surrounding area of the vehicle based on the determined direction and distance.

According to another aspect of the present disclosure, a method of generating an image includes detecting at least one object near a vehicle by using a result of sensing a surrounding area of the vehicle, determining a direction and a distance from the vehicle to the detected at least one object, and generating an image of the surrounding area of the vehicle based on the determined direction and distance.

BRIEF DESCRIPTION OF DRAWINGS

FIG. 18 is a flowchart of another example of a method of generating an image, according to an embodiment.

FIGS. 20A to 20D are images for describing examples of an image displayed according to an embodiment.

FIGS. 21 and 22 are block diagrams of examples of a driver assistance apparatus including a processor according to an embodiment.

MODE OF DISCLOSURE

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in corresponding parts of the embodiments. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The term " . . . unit" or " . . . module" is used to denote an entity for performing at least one function or operation, and may be embodied as hardware, software, or a combination of hardware and software.

Hereinafter, the present disclosure will be described in detail by explaining embodiments of the disclosure with reference to the attached drawings. The disclosure may, however, be embodied in many different forms and is not construed as being limited to the embodiments set forth herein.

Reference will now be made in detail to embodiments, examples of which are illustrated in the accompanying drawings.

Figure 1:
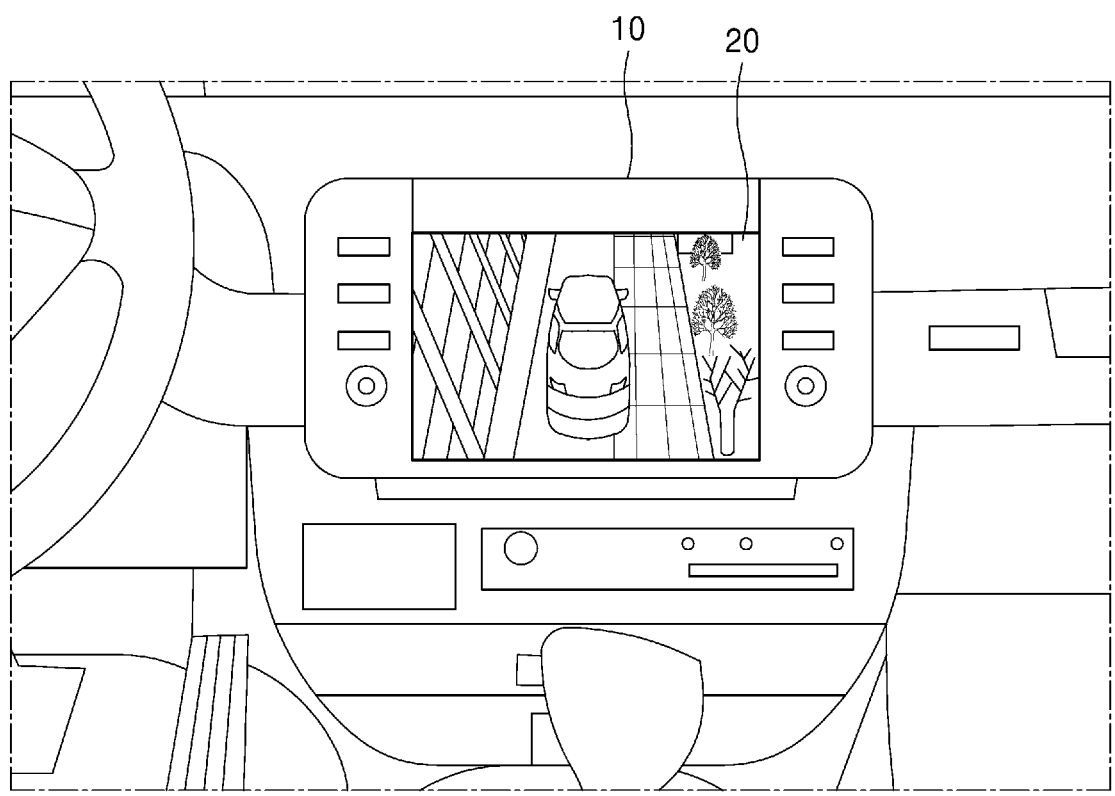
FIG. 1 is a diagram for describing an example of displaying an image on a vehicle, according to an embodiment.

FIG. 1 is a diagram for describing an example of displaying an image on a vehicle, according to an embodiment.

FIG. 1 shows an example in which an image 20 of a surrounding area of a vehicle is displayed on a display device 10 of the vehicle. For example, the display device 10 may be a center information display device, but is not limited thereto. The image 20 may be generated due to operation of a sensor included in the vehicle.

When the image 20 displayed on the display device 10 is a three-dimensional (3D) image, the 3D image 20 may be generated by warping a two-dimensional (2D) image on a 3D mesh. In this case, depending on a structure of the 3D mesh, objects near the vehicle may be distorted on the 3D image 20. For example, shapes or sizes of the objects near the vehicle may be distorted on the 3D image 20.

An example in which the objects near the vehicle are distorted on the 3D image 20 will now be described with reference to FIG. 2.

Figure 2:
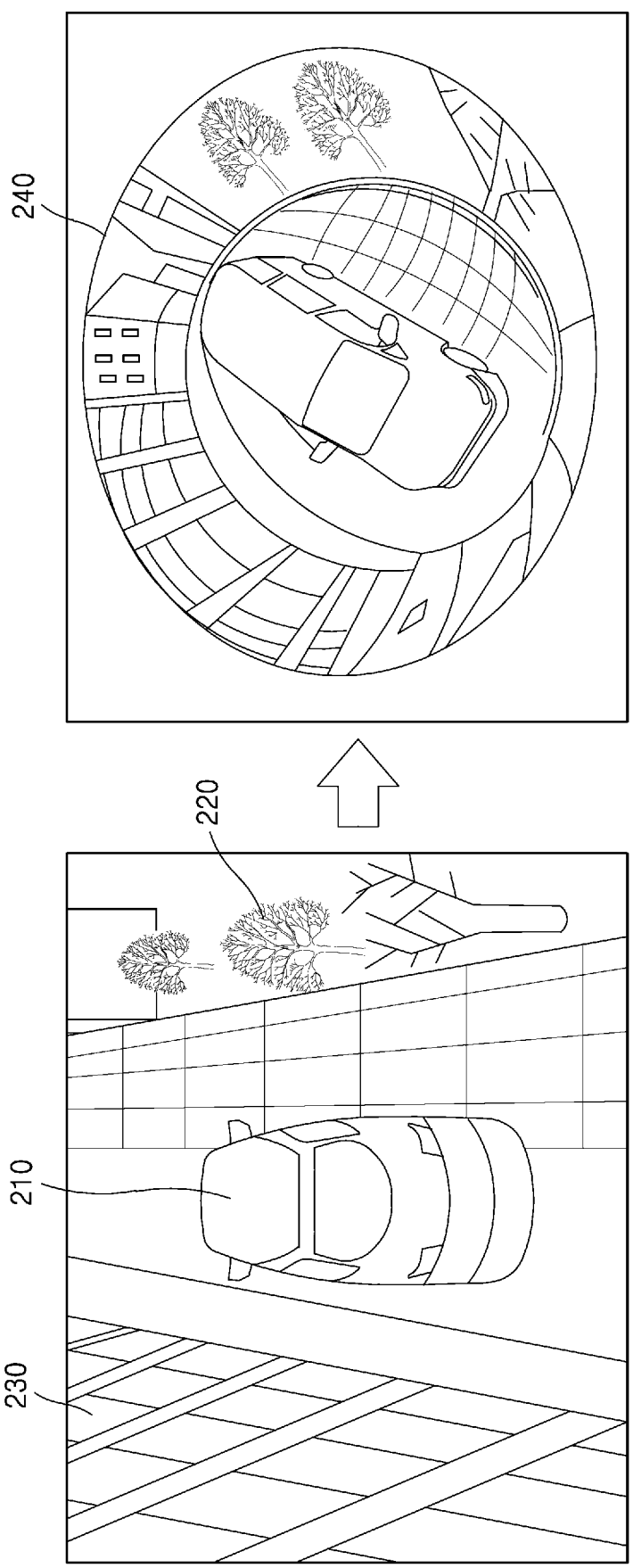
FIG. 2 is a diagram for describing an example of a distorted three-dimensional (3D) image, according to an embodiment.

FIG. 2 is a diagram for describing an example of a distorted 3D image, according to an embodiment.

Referring to FIG. 2, it is assumed that a vehicle 210 is being driven on a road and trees 220 and buildings 230 are located near the vehicle 210. It is also assumed that an image of a surrounding area of the vehicle 210 is captured by at least one camera included in the vehicle 210.

The image generated due to operation of the camera may be warped on a 3D mesh and thus be rendered into a 3D image 240. In this case, due to a structure of the 3D mesh, the objects 220 and 230 may be 3D-modeled regardless of actual locations thereof. For example, a region close to the vehicle 210 may be modeled into a horizontal plane, a region far from the vehicle 210 may be modeled into a vertical plane, and thus the 3D image 240 may be a bird view image.

Therefore, when the 3D image 240 is displayed, a user (e.g., a driver or a passenger of the vehicle 210) may not easily identify accurate locations and shapes of the objects 220 and 230. Depending on a degree of distortion of the 3D image 240, the user may not easily accurately determine whether the objects 220 and 230 are located near the vehicle 210.

Referring back to FIG. 1, a processor according to an embodiment may modify the 3D mesh based on actual locations of the objects near the vehicle. Alternatively, the processor may select an appropriate 3D mesh from among prestored 3D meshes based on the actual locations of the objects near the vehicle. Therefore, shapes of the objects and relative locations between the vehicle and the objects may be accurately expressed on the 3D image 20.

Specifically, the processor detects objects near the vehicle by using a result of photographing a surrounding area of the vehicle. The processor determines a mesh (e.g., a 3D mesh) to be applied to the image including the objects, by using locations of the detected objects. The processor generates the image 20 of the surrounding area of the vehicle by using the determined mesh. For example, the processor may calculate a distance from the vehicle to an object and an azimuth of the object with respect to the vehicle, and determine the mesh based on the calculated distance and azimuth.

Examples in which the processor generates an image of a surrounding area of a vehicle will now be described with reference to FIGS. 3 to 17.

Figure 3:
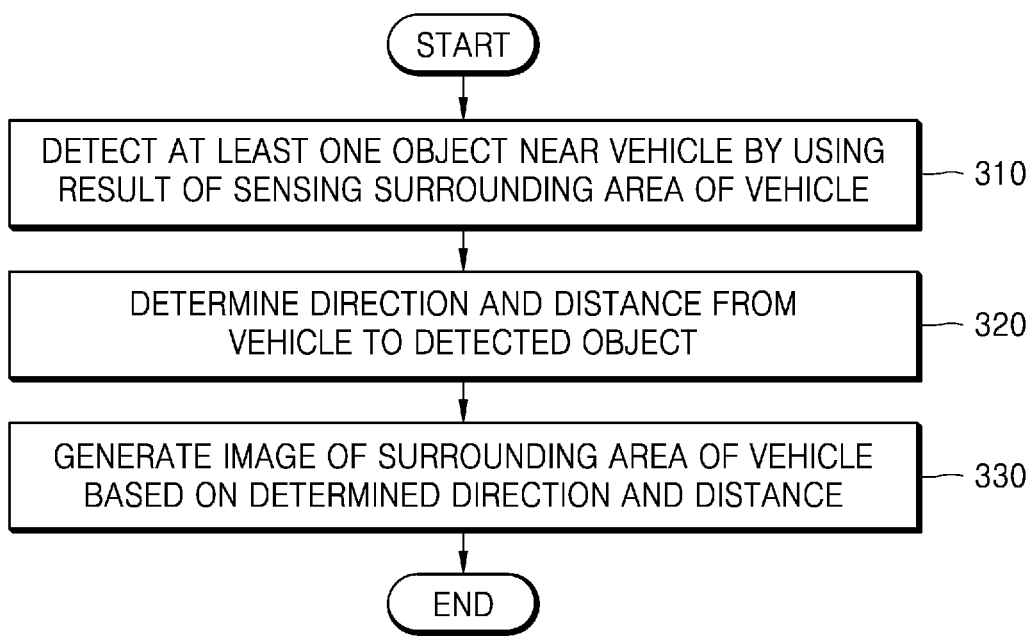
FIG. 3 is a flowchart of an example of a method of generating an image, according to an embodiment.

FIG. 3 is a flowchart of an example of a method of generating an image, according to an embodiment.

In operation 310, a processor detects at least one object near a vehicle by using a result of sensing a surrounding area of the vehicle. A sensor for sensing the surrounding area of the vehicle may include, for example, an image sensor, a lidar module, or a radar module. The image sensor may include a camera, and the camera may include a mono camera, a stereo camera, an infrared camera, an ultrasonic camera, or a thermal camera, but is not limited thereto.

For example, the processor may receive the result of sensing the surrounding area of the vehicle, from the sensor included in the vehicle, and detect the object near the vehicle by using the received information. Herein, the object refers to a person, an animal, a plant, or a thing located near a road on which the vehicle is being driven. For example, in addition to a person, an animal, or a plant, the object may include a traffic light, a traffic sign, a median strip, a utility pole, or another vehicle.

As an example, the camera of the vehicle may photograph the surrounding area of the vehicle, and the processor may detect the object in an image generated due to operation of the camera.

As another example, the radar module or the lidar module of the vehicle may transmit a signal to the surrounding area of the vehicle, and the processor may determine a location of the object and a type of the object by analyzing a signal reflected from the object (hereinafter referred to as a 'reflected signal'). For example, an antenna of the radar module may have a multi-array structure or a parabolic structure, but is not limited thereto.

As another example, the processor may determine the location of the object and the type of the object by using the camera of the vehicle and the radar/lidar module of the vehicle together.

For example, when the vehicle is being driven (for example, in a foggy weather), an object located close to the vehicle may be identified but an object located far from the vehicle may not be easily identified in an image captured by the camera. However, even when an object is not identified in the image captured by the camera, the processor may detect the object by analyzing a reflected signal of a signal transmitted by the radar/lidar module. Therefore, the processor may detect objects near the vehicle by using the camera and the radar/lidar module regardless of a driving environment of the vehicle.

An example in which the processor detects an object in an image will now be described with reference to FIG. 4.

Figure 4:
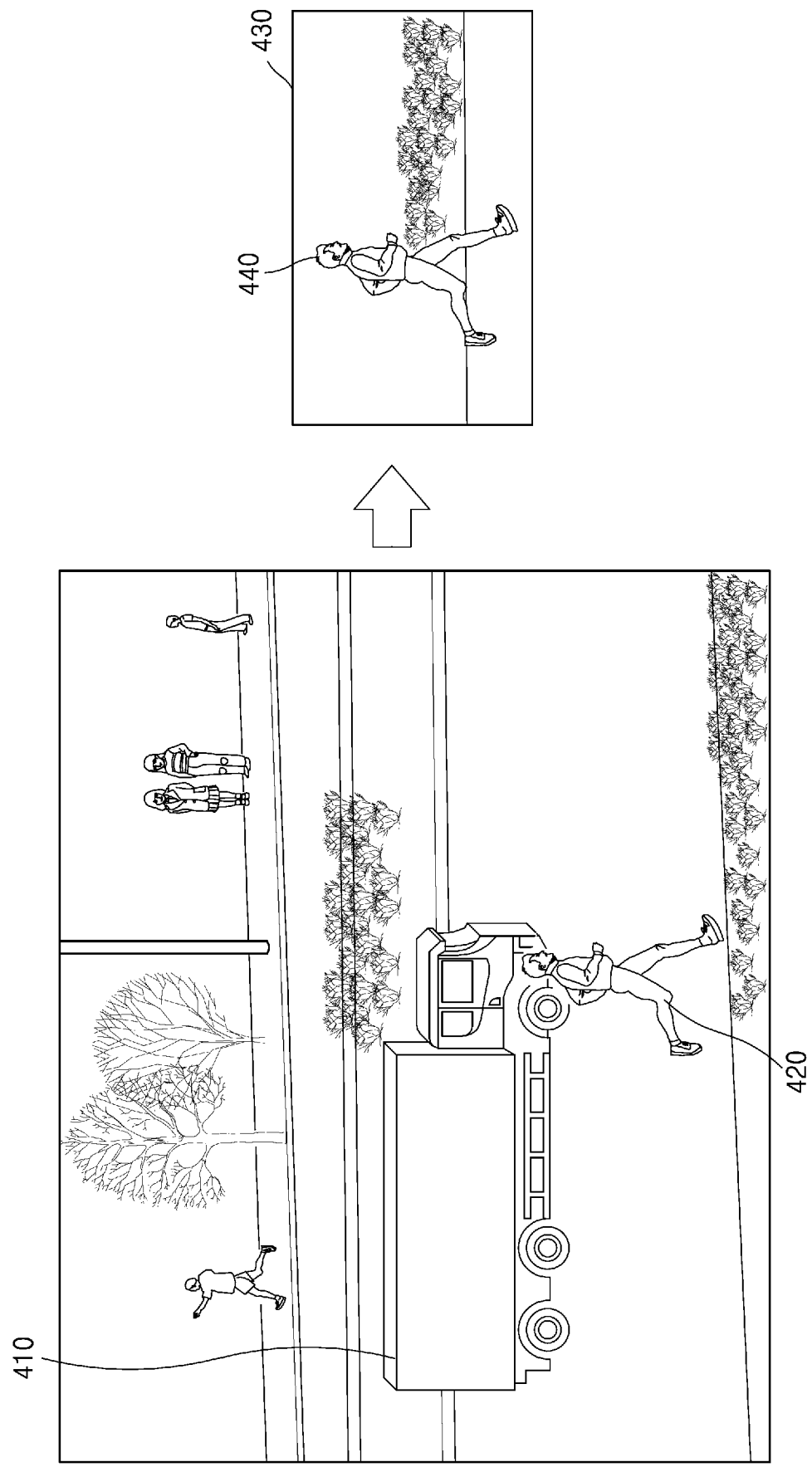
FIG. 4 is a diagram for describing an example in which a processor according to an embodiment detects an object in an image.

FIG. 4 is a diagram for describing an example in which a processor according to an embodiment detects an object in an image.

FIG. 4 shows an example in which a vehicle 410 is being driven on a road and a pedestrian 420 passes near the vehicle 410. As a camera included in the vehicle 410 photographs a surrounding area of the vehicle 410, an image 430 including the pedestrian 420 may be generated. In this case, a still image may be generated as the camera of the vehicle 410 discontinuously operates one time, or a moving image may be generated as the camera of the vehicle 410 continuously operates.

The processor may separate an object 440 from the image 430 by analyzing the image 430. For example, the processor may separate the object 440 from the image 430 by configuring a graph of the image 430 and applying a graph cut algorithm to the configured graph. Herein, the graph cut algorithm refers to an algorithm for dividing pixels included in the image 430 into pixels corresponding to the object 440 and pixels not corresponding to the object 440 by cutting a graph by using a threshold value. However, the graph cut algorithm is merely an example and the processor may separate the object 440 from the image 430 by using various image separation methods.

The processor may identify a type of the separated object 440. For example, the processor may identify the object 440 as a person by comparing a shape of the object 440 to information stored in memory.

Referring back to FIG. 3, in operation 320, the processor determines a direction and a distance from the vehicle to the detected object.

For example, assuming that the surrounding area of the vehicle is flat, the processor may calculate the distance from the vehicle to the object based on a vertical resolution of the image. When the object is identified in the image, the processor may calculate a distance from the camera having captured the image, to the identified object. For example, when the object has a height, the processor may calculate a distance from the camera to the object with respect to a bottom surface of the object. In general, a distance to an object located at a lower part of the image is greater than a distance to an object located at an upper part of the image. Information about an actual distance corresponding to a pixel of the image may be prestored. Information about a location at which the camera is embedded in the vehicle may also be prestored. Therefore, the processor may calculate the distance from the camera to the object based on a location of the object in the image. The processor may also calculate a distance from the vehicle to the object based on the distance from the camera to the object.

A method of calculating the distance from the vehicle to the object may differ depending on a type of the camera included in the vehicle. As an example, an example in which the processor calculates the distance from the vehicle to the object when the camera is a mono camera will be described below with reference to FIG. 6. As another example, an example in which the processor calculates the distance from the vehicle to the object when the camera is a stereo camera will be described below with reference to FIG. 7. As another example, when the camera is an infrared camera or a thermal camera, the processor may calculate the distance from the vehicle to the object by using a time of arrival (TOA) of an infrared signal transmitted from the camera. In other words, the processor may calculate the distance from the vehicle to the object by using a time at which an infrared signal returns to the camera after being reflected from the object, and a speed of the infrared signal.

The radar module/lidar module of the vehicle may transmit radial signals and the processor may estimate the distance from the vehicle to the object by analyzing a pattern of reflected signals corresponding to the radial signals. The processor may estimate an azimuth of the object based on direction angles and Doppler frequencies of the reflected signals, and estimate a speed and/or a direction of motion assuming that the object is moving.

In operation 330, the processor generates an image of the surrounding area of the vehicle based on the determined direction and distance.

For example, the processor determines a mesh to be applied to the image including the object, by using the distance from the vehicle to the object and the direction of the object with respect to the vehicle.

Specifically, the processor may generate a mesh corresponding to the object, in consideration of the location of the detected object. As an example, the processor may generate a mesh corresponding to the object, by cutting off a part of a prestored mesh based on the location of the object. As another example, the processor may select a mesh corresponding to the object, from among a plurality of prestored meshes based on the location of the object. As another example, the processor may generate a mesh corresponding to the object, by changing an aspect ratio of a part of a prestored mesh based on the location of the object.

Herein, the location of the object may refer to a relative distance between the vehicle and the object. For example, the location of the object may refer to a distance and/or an azimuth to the object with respect to the sensor of the vehicle, or a distance and/or an azimuth to the object with respect to a center point of the vehicle.

Examples in which the processor determines the mesh by using the location of the object will be described below with reference to FIGS. 5 to 17.

For example, the processor may generate a 3D image by warping the 2D image generated due to operation of the camera, on the determined mesh. An example in which the 2D image is warped on the mesh is well known to one of ordinary skill in the art, and thus a detailed description thereof will not be provided herein.

Figure 5:
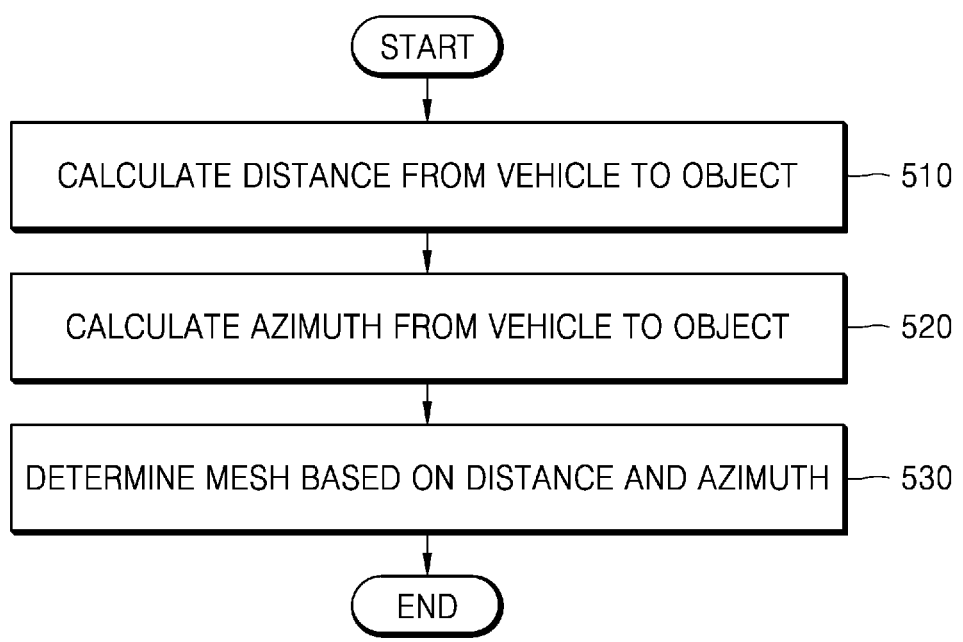
FIG. 5 is a flowchart showing an example in which a processor according to an embodiment determines a mesh by using a direction and a distance to an object.

FIG. 5 is a flowchart showing an example in which a processor according to an embodiment determines a mesh by using a direction and a distance from a vehicle to an object.

In operation 510, the processor calculates a distance from a vehicle to an object.

As an example, the processor may separate a shape of the object from an image captured by a camera, and calculate the distance from the vehicle to the object with respect to a bottom point of the separated shape. As another example, the processor may calculate the distance from the vehicle to the object by using a TOA of a reflected signal received by a radar module or a lidar module, and a speed of the reflected signal.

In operation 520, the processor calculates an azimuth from the vehicle to the object.

As an example, the processor may calculate the azimuth of the object with respect to the vehicle based on how far the shape of the object is spaced apart from a certain line of the image (e.g., a center line of the image). As another example, the processor may calculate the azimuth of the object with respect to the vehicle based on a direction in which the reflected signal reaches the radar module or the lidar module.

Examples in which the processor calculates the distance and the azimuth from the vehicle to the object will be described below with reference to FIGS. 6 to 9. Specifically, an example in which the processor calculates the distance from the vehicle to the object when the camera is a mono camera will be described below with reference to FIG. 6. An example in which the processor calculates the distance from the vehicle to the object when the camera is a stereo camera will be described below with reference to FIG. 7. An example in which the processor calculates the distance and the azimuth based on an image will be described below with reference to FIG. 8, and an example in which the processor calculates the distance and the azimuth based on a reflected signal received by the radar module or the lidar module will be described below with reference to FIG. 9.

in operation 530, the processor determines a mesh based on the calculated distance and azimuth. As an example, the processor may generate a mesh corresponding to the object, by cutting off a part of a prestored mesh based on the calculated distance and azimuth. As another example, the processor may select a mesh corresponding to the object, from among a plurality of prestored meshes based on the calculated distance and azimuth. As another example, the processor may generate a mesh corresponding to the object, by changing an aspect ratio of a part of a prestored mesh based on the calculated distance and azimuth. Examples in which the processor determines the mesh will be described below with reference to FIGS. 10 to 17.

Figure 6:
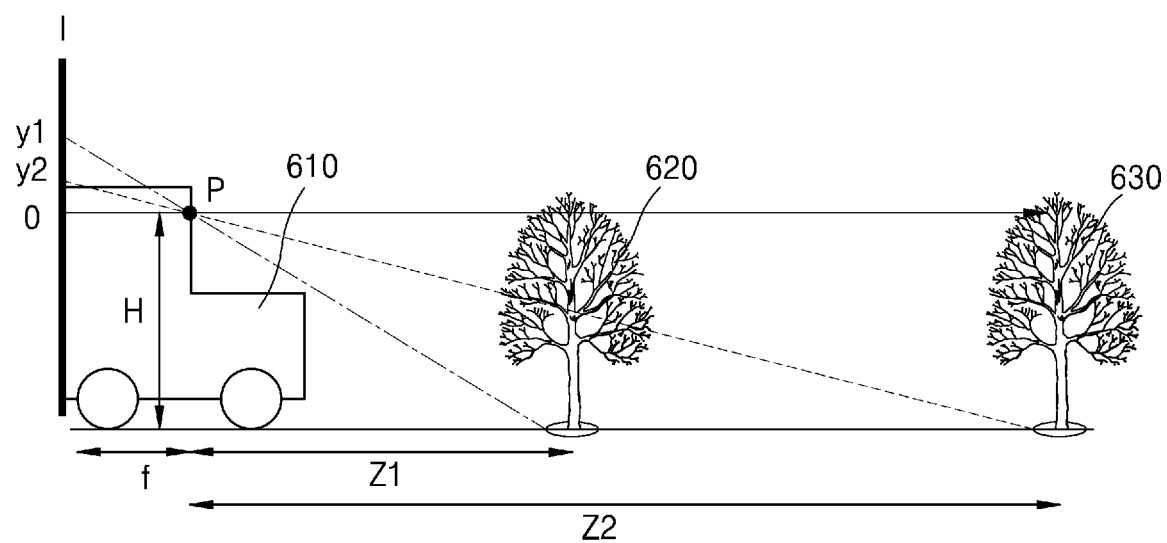
FIG. 6 is a diagram for describing an example in which a processor calculates a distance from a vehicle to an object when a camera according to an embodiment is a mono camera.

FIG. 6 is a diagram for describing an example in which a processor calculates a distance from a vehicle to an object when a camera according to an embodiment is a mono camera.

When a vehicle 610 includes a mono camera P, the processor may calculate a distance from the mono camera P to an object 620 or 630. In this case, information about a location at which the mono camera P is embedded in the vehicle 610 may be prestored. Therefore, the processor may calculate the distance from the vehicle 610 to the object 620 or 630. Although the objects 620 and 630 are illustrated as trees in FIG. 6 for convenience of explanation, the objects 620 and 630 are not limited to the trees.

For example, the processor may calculate the distance from the vehicle 610 to the object 620 or 630 based on Equation 1.

$$\frac{y}{f} = \frac{H}{Z} \quad \therefore Z = \frac{fH}{y} \qquad <\text{Equation 1}>$$

In Equation 1, y denotes a height in an image I. In addition, f denotes a focal length of a lens of the mono camera P, and H denotes a height from ground to the mono camera P. Z denotes a distance from the mono camera P to the object 620 or 630.

Among the parameters of Equation 1, f and H may be previously set. Therefore, the processor may find a location y of a lower surface (e.g., a part that meets the bottom) of the object 620 or 630 in the image I, and calculate the distance Z from the location y to the object 620 or 630 based on Equation 1.

Figure 7:
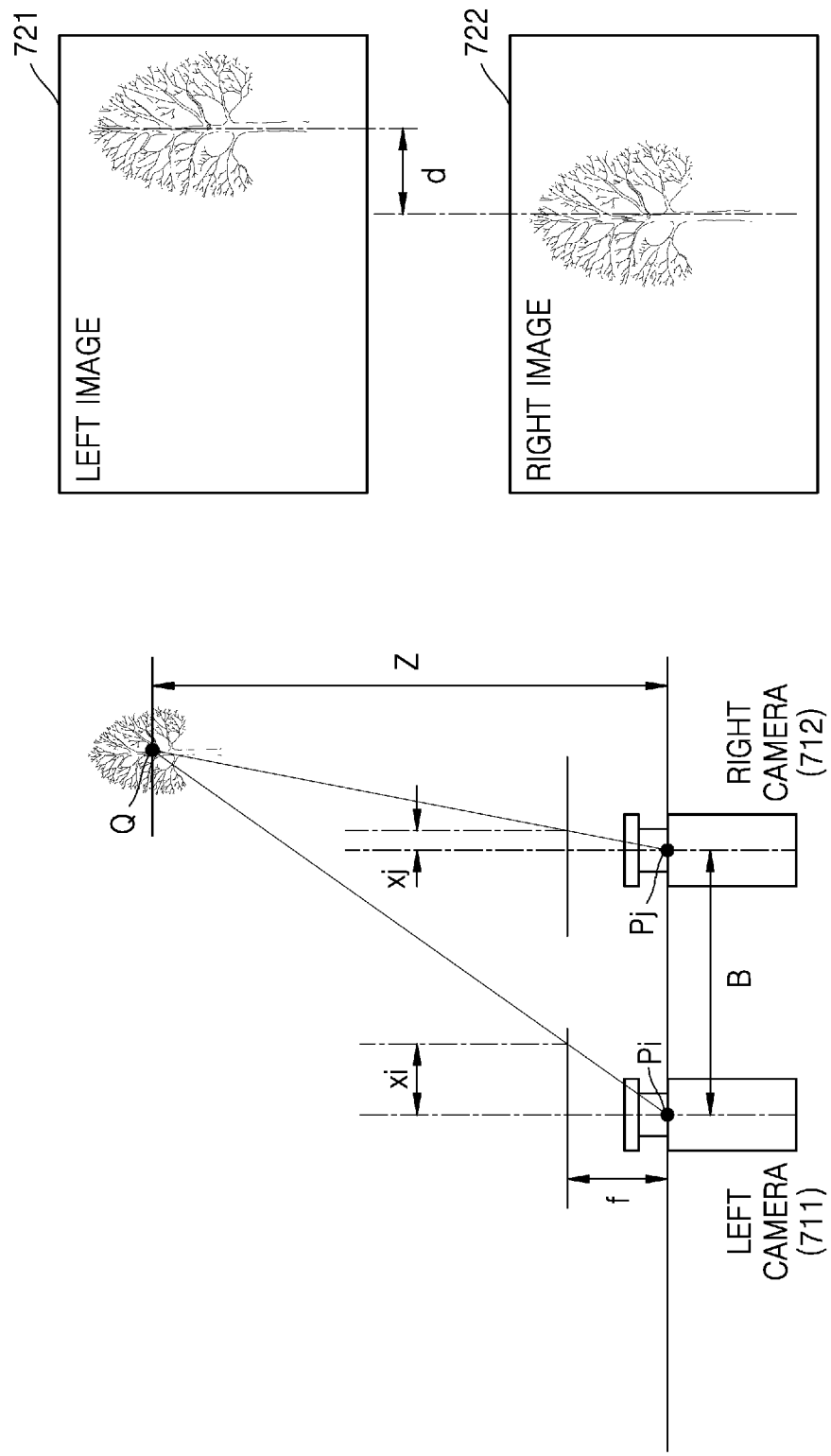
FIG. 7 is a diagram for describing an example in which a processor calculates a distance from a vehicle to an endpoint of a traffic lane when a camera according to an embodiment is a stereo camera.

FIG. 7 is a diagram for describing an example in which a processor calculates a distance from a vehicle to an endpoint of a traffic lane when a camera according to an embodiment is a stereo camera.

When a vehicle includes a stereo camera 711 and 712, the processor may calculate a distance from the stereo camera 711 and 712 to an object Q. In this case, information about a location at which the stereo camera 711 and 712 is embedded in the vehicle may be prestored. Therefore, the processor may calculate the distance from the vehicle to the object Q. Although the object Q is illustrated as a tree in FIG. 6 for convenience of explanation, the object Q is not limited to the tree.

In FIG. 7, the stereo camera 711 and 712 includes a left camera 611 and a right camera 712, an image generated by the left camera 711 is referred to as a left image 721, and an image generated by the right camera 712 is referred to as a right image 722.

For example, the processor may calculate the distance from the vehicle to the object Q based on Equation 2.

$$Z=(B\times f)/d, \text{ where } d=x_i-x_j \qquad <\text{Equation 2}>$$

In Equation 2, Z denotes a distance from the stereo camera 711 and 712 and the object Q, and B denotes a distance between the left and right cameras 711 and 712. In addition, f denotes a focal length of lenses of the stereo camera 711 and 712, and d denotes a parallax between the left and right images 721 and 722.

Among the parameters of Equation 2, f and B may be previously set. Therefore, the processor may calculate the distance Z from the vehicle to the object Q based on the parallax d between the left and right images 721 and 722.

Figure 8:
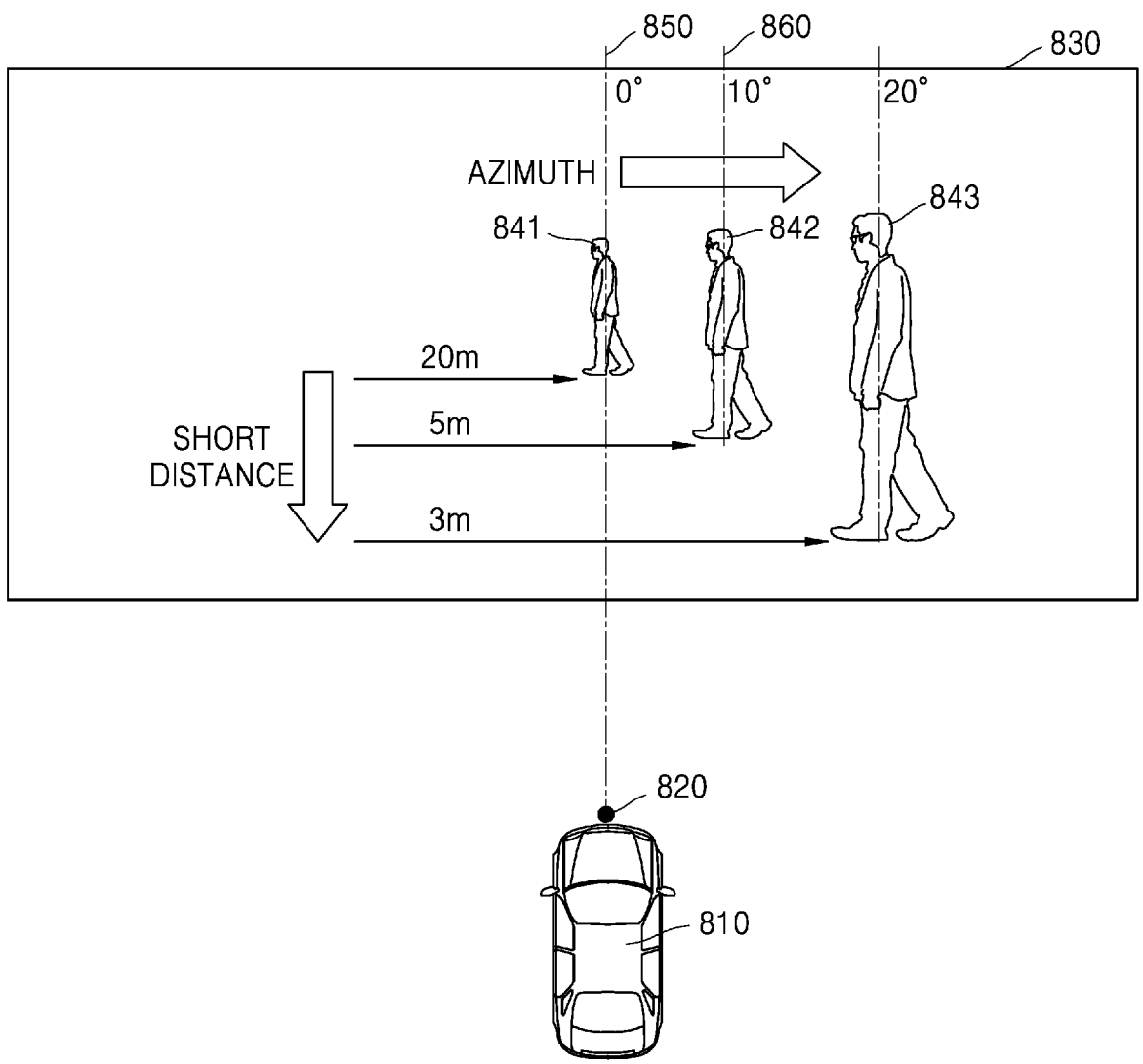
FIG. 8 is a diagram for describing an example in which a processor according to an embodiment calculates a distance and an azimuth from a vehicle to an object by using an image.

FIG. 8 is a diagram for describing an example in which a processor according to an embodiment calculates a distance and an azimuth from a vehicle to an object by using an image.

FIG. 8 shows an example of an image 830 captured by a sensor 820 of a vehicle 810. Herein, the sensor 820 refers to a camera, a radar module, a lidar module, or a combination of a camera and a radar module. Therefore, the image 830 illustrated in FIG. 8 refers to an image generated based on information obtained due to operation of the sensor 820. The image 830 includes objects 841, 842, and 843.

The processor may calculate distances from the vehicle 810 or the sensor 820 to the objects 841, 842, and 843 based on locations of the objects 841, 842, and 843 in the image 830.

In general, the object 843 close to the sensor 820 is shown in a lower part of the image 830, and the object 841 far from the sensor 820 is shown in an upper part of the image 830. The number of pixels included in the image 830 may be previously determined based on a resolution of the sensor 820. Therefore, distances from the sensor 820 may be previously mapped to individual pixels included in the image 830. In other words, when the object 841 is shown on the image 830, the processor may calculate the distance from the sensor 820 to the object 841 based on a location of the pixels corresponding to the object 841.

For example, the processor may separate a shape of the object 841 from the image 830, and select a location of a pixel corresponding to a bottom point of the separated shape. The processor may check a distance (e.g., 20 m) previously mapped to the selected pixel, and determine the distance from the sensor 820 to the object 841 as the checked distance (e.g., 20 m).

The sensor 820 may be embedded in the vehicle 810 at a fixed location. Therefore, a relative location between a certain location (e.g., a center point) of the vehicle 810 and the sensor 820 may be previously set. Therefore, the processor may calculate a distance from the certain location of the vehicle 810 to the object 841 by using the distance from the sensor 820 to the object 841, which is calculated by analyzing the image 830.

As described above, the processor may individually separate shapes of the different objects 842 and 843 from the image 830, and calculate distances from the vehicle 810 or the sensor 820 to the objects 842 and 843.

The processor may calculate azimuths of the objects 841, 842, and 843 with respect to the vehicle 810 or the sensor 820 based on locations of the objects 841, 842, and 843 in the image 830.

In general, the object 841 shown on a center line 850 of the image 830 is located right in front of the sensor 820. The number of pixels included in the image 830 may be previously determined based on a resolution of the sensor 820. Therefore, azimuths with respect to the sensor 820 may be previously mapped to individual pixels included in the image 830. In other words, assuming that pixels located on the center line 850 have an azimuth of 0°, azimuths of pixels far from the center line 850 may increase.

For example, it is assumed that the image 830 includes 1920×1080 pixels and the sensor 820 may detect the objects 841, 842, and 843 within a range of 0° to 90° at left and right sides from the center of the vehicle 810. In this case, each column at a left or right side with respect to the center line 850 of the image 830 has an azimuth of 0.09375° (=90°/960). Therefore, assuming that a center line 860 of the object 842 corresponds to a 107$^{th}$ column at a right side with respect to the center line 860, the processor may determine that the object 842 has an azimuth of 10° at a right side with respect to the sensor 820.

The processor may separate a shape of the object 842 from the image 830, check an azimuth (e.g., 10°) previously mapped to pixels located on the center line 860 of the separated shape, and determine the azimuth from the sensor 830 to the object 842, as the checked azimuth (e.g., 10°).

As described above, a relative location between the vehicle 810 and the sensor 820 may be previously set. Therefore, the processor may calculate an azimuth from the certain location of the vehicle 810 to the object 842 by using the azimuth from the sensor 820 to the object 842, which is calculated by analyzing the image 830.

As described above, the processor may individually separate shapes of the different objects 841 and 843 from the image 830, and calculate azimuths from the vehicle 810 or the sensor 820 to the objects 841 and 843.

Assuming that the sensor 820 continuously photographs a surrounding area of the vehicle 810 as time passes, the processor may estimate a speed and/or a direction of motion of the objects 841, 842, and 843 by individually analyzing a plurality of images according to the method described above in relation to FIG. 8.

Figure 9:
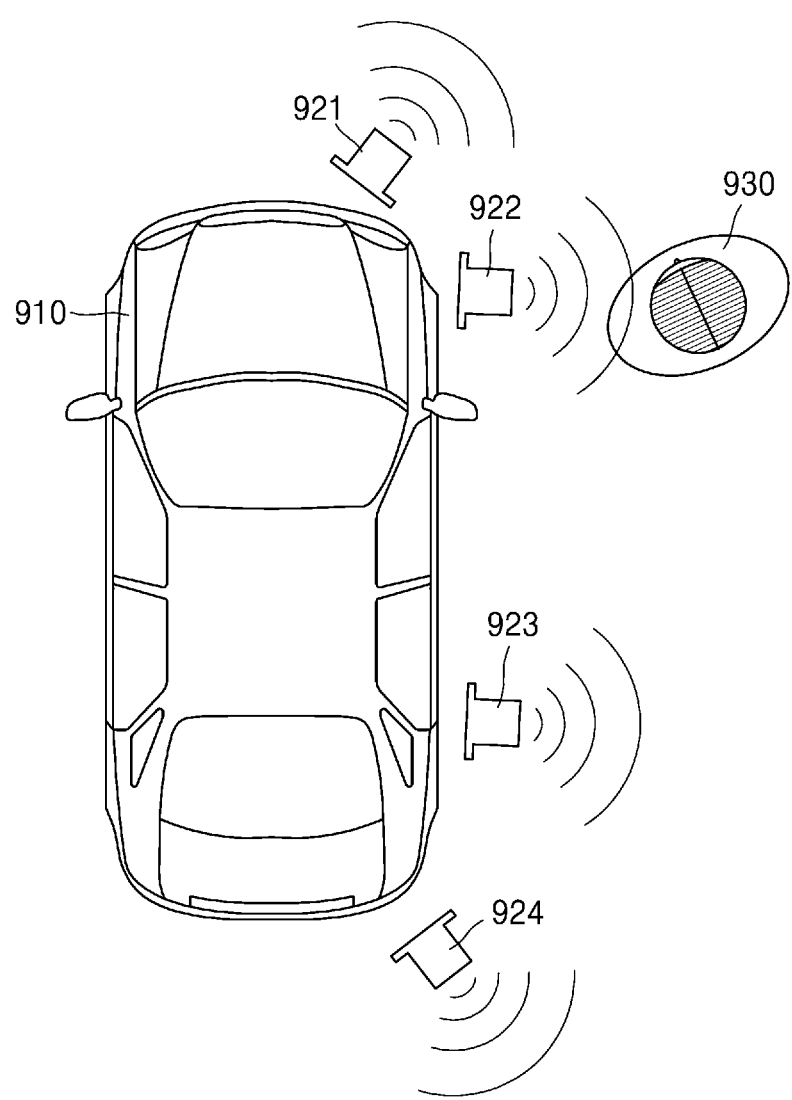
FIG. 9 is a diagram for describing an example in which a processor according to an embodiment calculates a distance and an azimuth from a vehicle to an object by using a reflected signal.

FIG. 9 is a diagram for describing an example in which a processor according to an embodiment calculates a distance and an azimuth from a vehicle to an object by using a reflected signal.

FIG. 9 illustrates a vehicle 910 in which a plurality of lidar modules 921, 922, 923, and 924 are embedded. Although four lidar modules 921, 922, 923, and 924 are illustrated in FIG. 9, the number of lidar modules is not limited thereto. The lidar modules 921, 922, 923, and 924 of FIG. 9 may also be implemented as radar modules or other devices capable of transmitting and receiving signals.

The lidar modules 921, 922, 923, and 924 transmit radial signals having a small included angle (e.g., equal to or less than 2°), and the processor may estimate a shape of an object 930 by analyzing a pattern of reflected signals corresponding to the radial signals. The processor may estimate an azimuth of the object 930 based on direction angles and Doppler frequencies of the reflected signals, and estimate a speed and/or a direction of motion assuming that the object 930 is moving.

Furthermore, the processor may calculate distances from the lidar modules 921, 922, 923, and 924 to the object 930 by using TOA values of the signals transmitted from the lidar modules 921, 922, 923, and 924. In other words, the processor may calculate the distances from the lidar modules 921, 922, 923, and 924 to the object 930 by using times at which the signals return to the lidar modules 921, 922, 923, and 924 after being reflected from the object 930, and speeds of the signals.

Relative locations between the vehicle 910 and the lidar modules 921, 922, 923, and 924 may be previously set. Therefore, the processor may calculate a distance and an azimuth from a certain location of the vehicle 910 (e.g., a center point of the vehicle 910) to the object 930.

Figure 10:
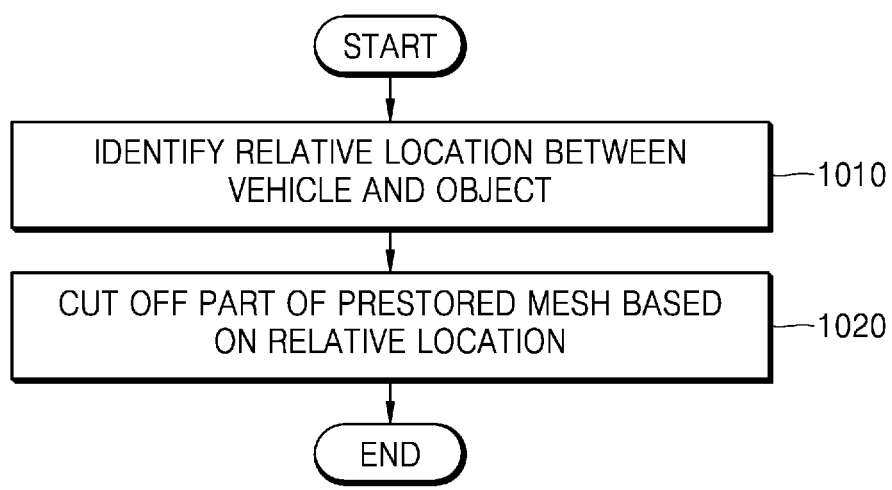
FIG. 10 is a flowchart showing an example in which a processor according to an embodiment determines a mesh.

FIG. 10 is a flowchart showing an example in which a processor according to an embodiment determines a mesh.

In operation 1010, the processor identifies a relative location between a vehicle and an object.

For example, the processor may identify a distance from the vehicle to the object and an azimuth of the object with respect to the vehicle. Examples in which the processor calculates the distance from the vehicle to the object and the azimuth of the object with respect to the vehicle are described above in relation to FIGS. 5 to 9.

In operation 1020, the processor cuts off a part of a prestored mesh based on the relative location.

For example, the processor may assume that the vehicle is located at the center of a basic mesh, and determine a point at which the object is located on the basic mesh. The processor may generate a new mesh by cutting the basic mesh with respect to the point at which the object is located on the basic mesh. An example in which the processor cuts off a part of a basic mesh will now be described with reference to FIG. 11.

Figure 11:
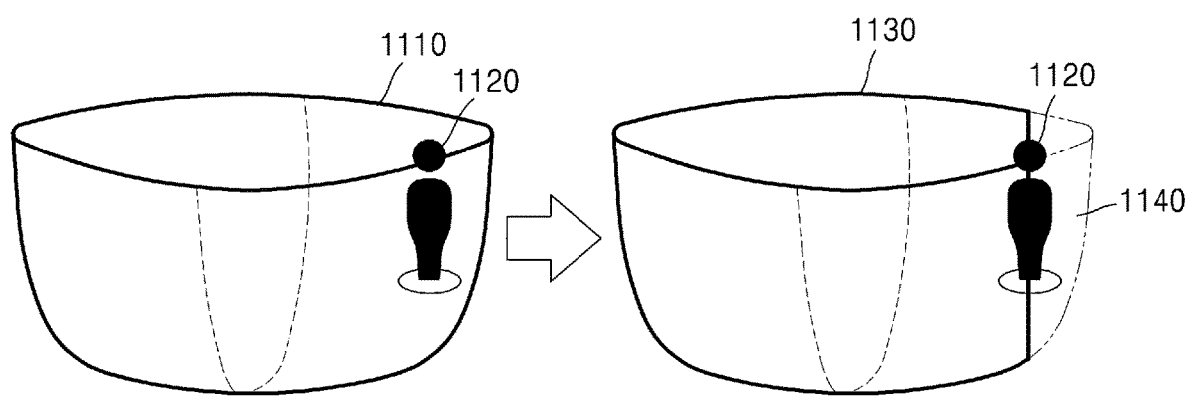
FIG. 11 is a diagram for describing an example in which a processor according to an embodiment cuts off a part of a mesh.

FIG. 11 is a diagram for describing an example in which a processor according to an embodiment cuts off a part of a mesh.

FIG. 11 shows an example of a prestored mesh 1110 and a point at which an object 1120 is located on the mesh 1110. It is assumed that a vehicle is located at the center of the mesh 1110. Therefore, a 3D image generated based on the mesh 1110 may be an image of a surrounding area of the vehicle.

When the 3D image is generated based on the mesh 1110, the object 1120 may be distorted on the 3D image. In other words, in the 3D image generated based on the mesh 1110, only objects located along the edge of the mesh 1110 may be modeled to a vertical plane. Therefore, when the object 1120 is located in the mesh 1110, a height of the object 1120 (e.g., a person) may not be appropriately expressed on the 3D image.

The processor may generate a new mesh 1130 by cutting the mesh 1110 with respect to the location of the object 1120 on the mesh 1110. Specifically, the processor may remove a part 1140 of the mesh 1110 with respect to the point at which the object 1120 is located. Therefore, the object 1120 may locate at the edge of the mesh 1130 and thus the height of the object 1120 may be appropriately expressed on a 3D image generated based on the mesh 1130.

The processor may store the newly generated mesh 1130 in memory.

Figure 12:
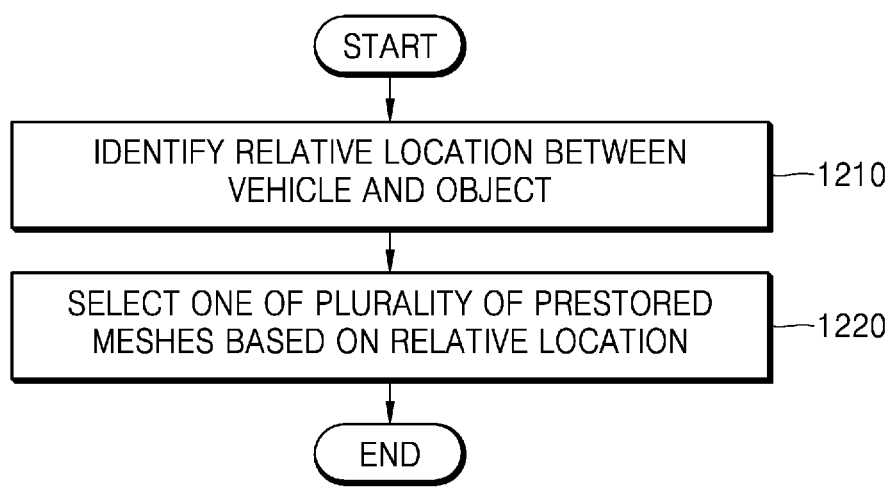
FIG. 12 is a flowchart showing another example in which a processor according to an embodiment determines a mesh.

FIG. 12 is a flowchart showing another example in which a processor according to an embodiment determines a mesh.

In operation 1210, the processor identifies a relative location between a vehicle and an object.

For example, the processor may identify a distance from the vehicle to the object and an azimuth of the object with respect to the vehicle. Examples in which the processor calculates the distance from the vehicle to the object and the azimuth of the object with respect to the vehicle are described above in relation to FIGS. 5 to 9.

In operation 1220, the processor selects one of a plurality of prestored meshes based on the relative location.

For example, various meshes modified from a basic mesh based on locations of objects may be stored in memory. The processor may select and read a mesh appropriate for the object, from among the meshes stored in the memory, based on the distance from the vehicle to the object and the azimuth of the object with respect to the vehicle. Examples in which the processor selects one of a plurality of prestored meshes will now be described with reference to FIGS. 13 and 14.

Figure 13:
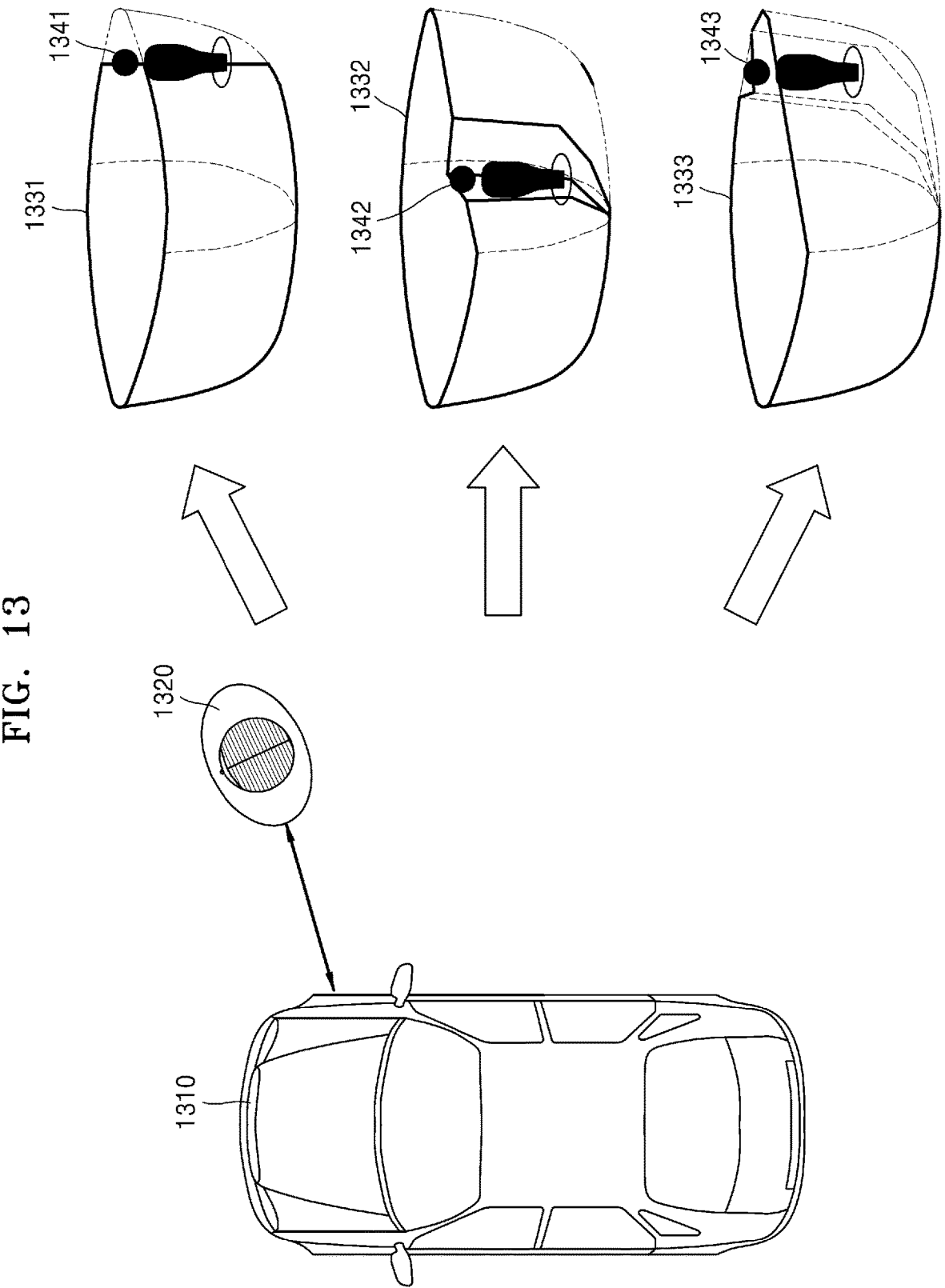
FIG. 13 is a diagram for describing an example in which a processor according to an embodiment selects one of a plurality of prestored meshes.

FIG. 13 is a diagram for describing an example in which a processor according to an embodiment selects one of a plurality of prestored meshes.

FIG. 13 shows an example of a vehicle 1310 and an object 1320 (e.g., a person) located near the vehicle 1310.

The processor identifies a relative location between the vehicle 1310 and the object 1320. Specifically, the processor checks a distance from the vehicle 1310 to the object 1320 and a direction in which the object 1320 is located with respect to the vehicle 1310. For example, as described above in relation to FIGS. 3 to 9, the processor may identify the relative location between the vehicle 1310 and the object 1320 by using an image captured by a camera or using a lidar/radar module.

A plurality of meshes 1331, 1332, and 1333 may be stored in memory of the vehicle 1310. For example, the meshes 1331, 1332, and 1333 obtained by cutting off parts of a basic mesh based on locations of objects 1341, 1342, and 1343 and/or types of the objects 1341, 1342, and 1343 may be stored in the memory.

The processor may select the mesh 1333 appropriate to express the object 1320, from among the prestored meshes 1331, 1332, and 1333 based on the relative location between the vehicle 1310 and the object 1320. Therefore, the processor may obtain the mesh 1333 appropriate to express the object 1320, without performing a calculation process required to generate a new mesh.

When the processor identifies the relative location between the vehicle 1310 and the object 1320 and a type of the object 1320 by using an image, the processor may select a mesh corresponding to a location of pixels representing the object 1320 in the image, from among the prestored meshes 1331, 1332, and 1333. An example in which the processor selects a mesh mapped to pixels, from among a plurality of prestored meshes will now be described with reference to FIG. 14.

Figure 14:
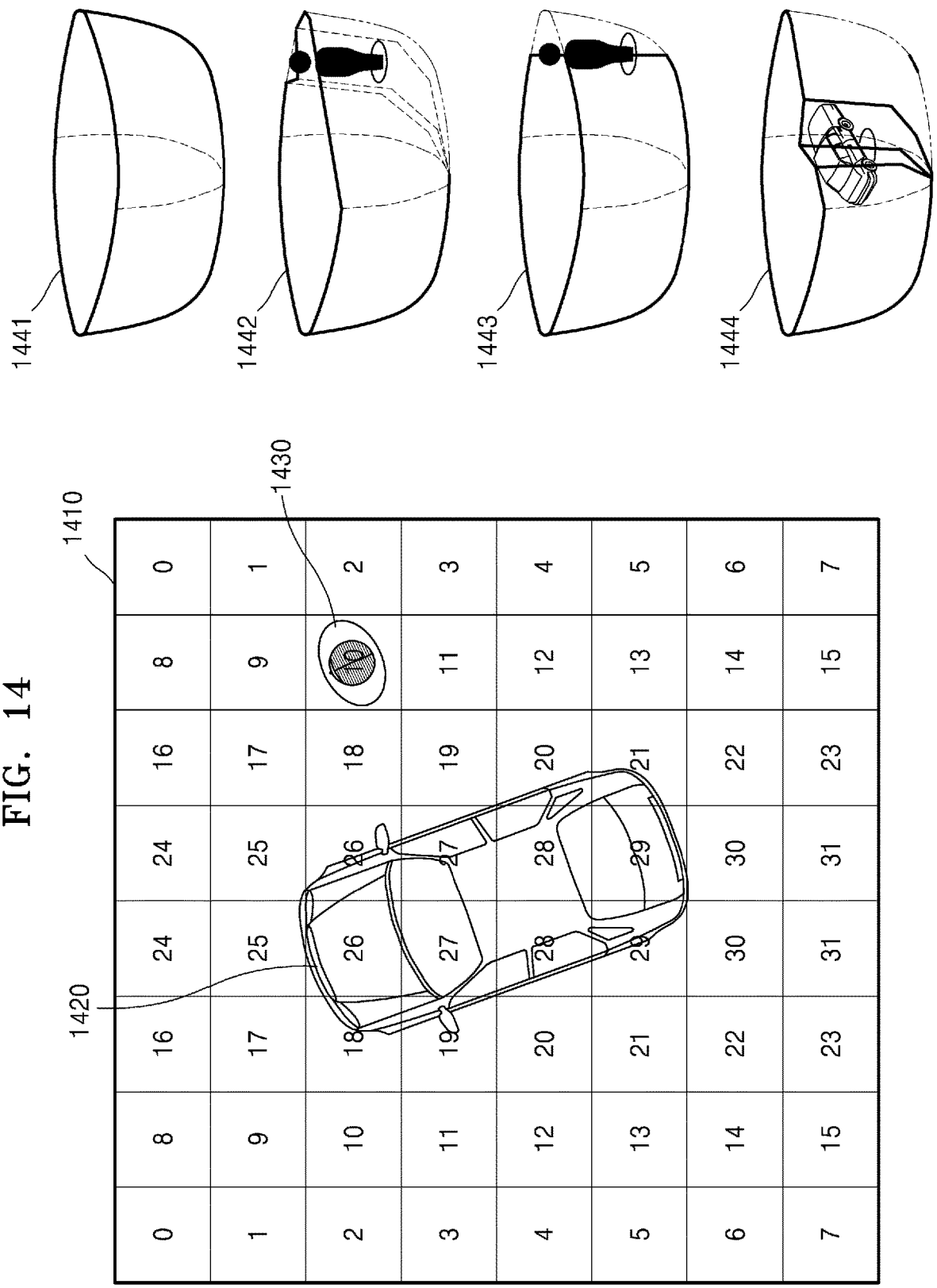
FIG. 14 is a diagram for describing an example in which a processor according to an embodiment selects a mesh mapped to pixels, from among a plurality of prestored meshes.

FIG. 14 is a diagram for describing an example in which a processor according to an embodiment selects a mesh mapped to pixels, from among a plurality of prestored meshes.

FIG. 14 shows an example of an image 1410 including a vehicle 1420 at the center thereof and including an object 1430 located near the vehicle 1420.

When a plurality of cameras are embedded in the vehicle 1420 at different locations, the processor may generate the image 1410 including the vehicle 1420 at the center thereof, by combining images generated due to operations of the cameras. The processor may divide the image 1410 into a plurality of areas and individually map the areas to prestored meshes. Herein, the areas may be generated by grouping pixels included in the image 1410.

The processor may map a different prestored mesh based on a type of the object 1430. For example, a mesh 1443 to be mapped when the object 1430 shown in 'area 10' of the image 1410 is a person may differ from a mesh 1444 to be mapped when the object 1430 shown in 'area 10' of the image 1410 is a vehicle.

The processor checks an area of the image 1410 in which the object 1430 is located, and the type of the object 1430. The processor may select the mesh 1443 appropriate to express the object 1430, from among prestored meshes 1441, 1442, 1443, and 1444. Therefore, the processor may obtain the mesh 1443 appropriate to express the object 1430, without performing a calculation process required to generate a new mesh.

Figure 15:
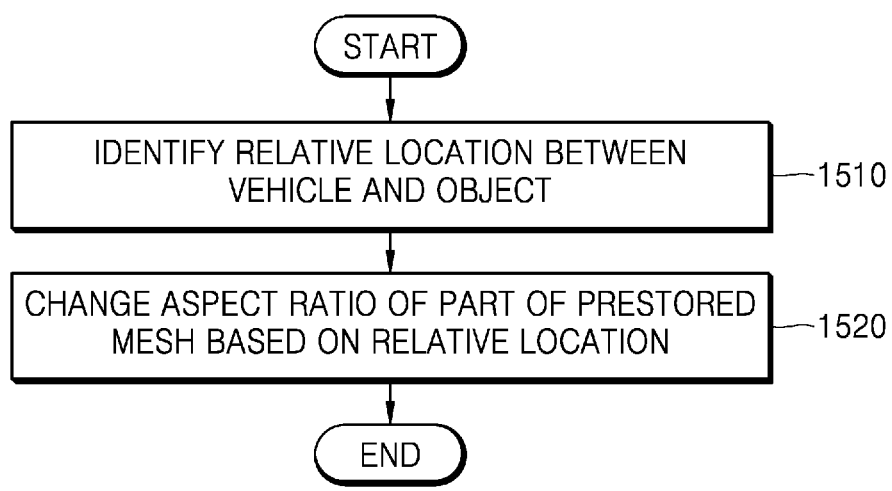
FIG. 15 is a flowchart showing another example in which a processor according to an embodiment determines a mesh.

FIG. 15 is a flowchart showing another example in which a processor according to an embodiment determines a mesh.

In operation 1510, the processor identifies a relative location between a vehicle and an object.

For example, the processor may identify a distance from the vehicle to the object and an azimuth of the object with respect to the vehicle. Examples in which the processor calculates the distance from the vehicle to the object and the azimuth of the object with respect to the vehicle are described above in relation to FIGS. 5 to 9.

In operation 1520, the processor changes an aspect ratio of a part of a prestored mesh based on the relative location.

For example, the processor may assume that the vehicle is located at the center of a basic mesh, and determine a point at which the object is located on the basic mesh. The processor may generate a new mesh by changing an aspect ratio of the basic mesh in such a manner that the edge of the basic mesh is located at the point at which the object is located on the basic mesh. Examples in which a processor cuts off a part of a mesh will now be described with reference to FIGS. 16 and 17.

Figure 16:
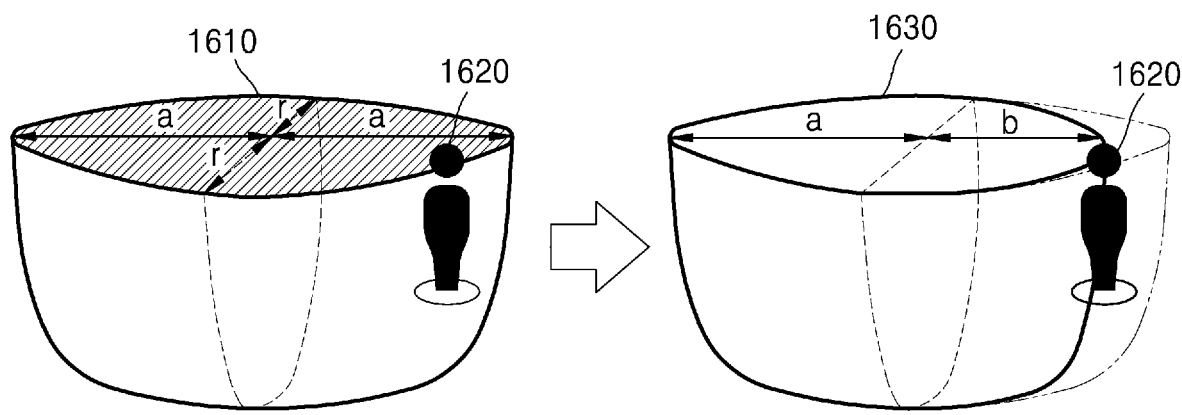
FIG. 16 is a diagram for describing an example in which a processor according to an embodiment changes an aspect ratio of a part of a mesh.

FIG. 16 is a diagram for describing an example in which a processor according to an embodiment changes an aspect ratio of a part of a mesh.

FIG. 16 shows an example of a prestored mesh 1610 and a point at which an object 1620 is located on the mesh 1610. It is assumed that a vehicle is located at the center of the mesh 1610. Therefore, a 3D image generated based on the mesh 1610 may be an image of a surrounding area of the vehicle.

The mesh 1610 may have a cylindrical shape, a conical shape, or a combination of cylindrical and conical shapes. In other words, when viewed from above, the mesh 1610 may have a circular shape having a radius a.

The processor may generate a new mesh 1630 by changing an aspect ratio of a part of the mesh 1610 with respect to a location of the object 1620 on the mesh 1610. For example, the processor may change the aspect ratio of a part of the mesh 1610 corresponding to the location of the object 1620.

Herein, the aspect ratio refers to a ratio of a horizontal length to a vertical length of a surface 1640 of the mesh 1610. When the mesh 1610 is viewed from above, the surface 1640 may have a circular or oval shape. Assuming that the surface 1640 is a circle, the mesh 1610 has an aspect ratio of 1:1. Assuming that the surface 1640 is an oval having a horizontal-direction radius a and a vertical-direction radius r, the mesh 1610 has an aspect ratio of a:r.

The processor may change the aspect ratio of the mesh 1610 in such a manner that the object 1620 is located on the edge of the mesh 1610. For example, when the mesh 1630 is viewed from above, the horizontal-direction radius of a part corresponding to the location of the object 1620 may be reduced from a to b. Therefore, the object 1620 may be located at the edge of the mesh 1630 and thus a height of the object 1620 may be appropriately expressed on a 3D image generated based on the mesh 1630.

Although the processor changes only the horizontal-direction radius a of the mesh 1610 in FIG. 16 for convenience of explanation, the processor may change the vertical-direction radius r of the mesh 1610 or both of the horizontal-direction radius a and the vertical-direction radius r based on the location of the object 1620.

The processor may store the newly generated mesh 1630 in memory.

Even when a plurality of objects are located near the vehicle, the processor may change the aspect ratio of the prestored mesh 1610 based on locations of the objects. An example in which the processor changes an aspect ratio of a mesh based on locations of a plurality of objects will now be described with reference to FIG. 17.

Figure 17:
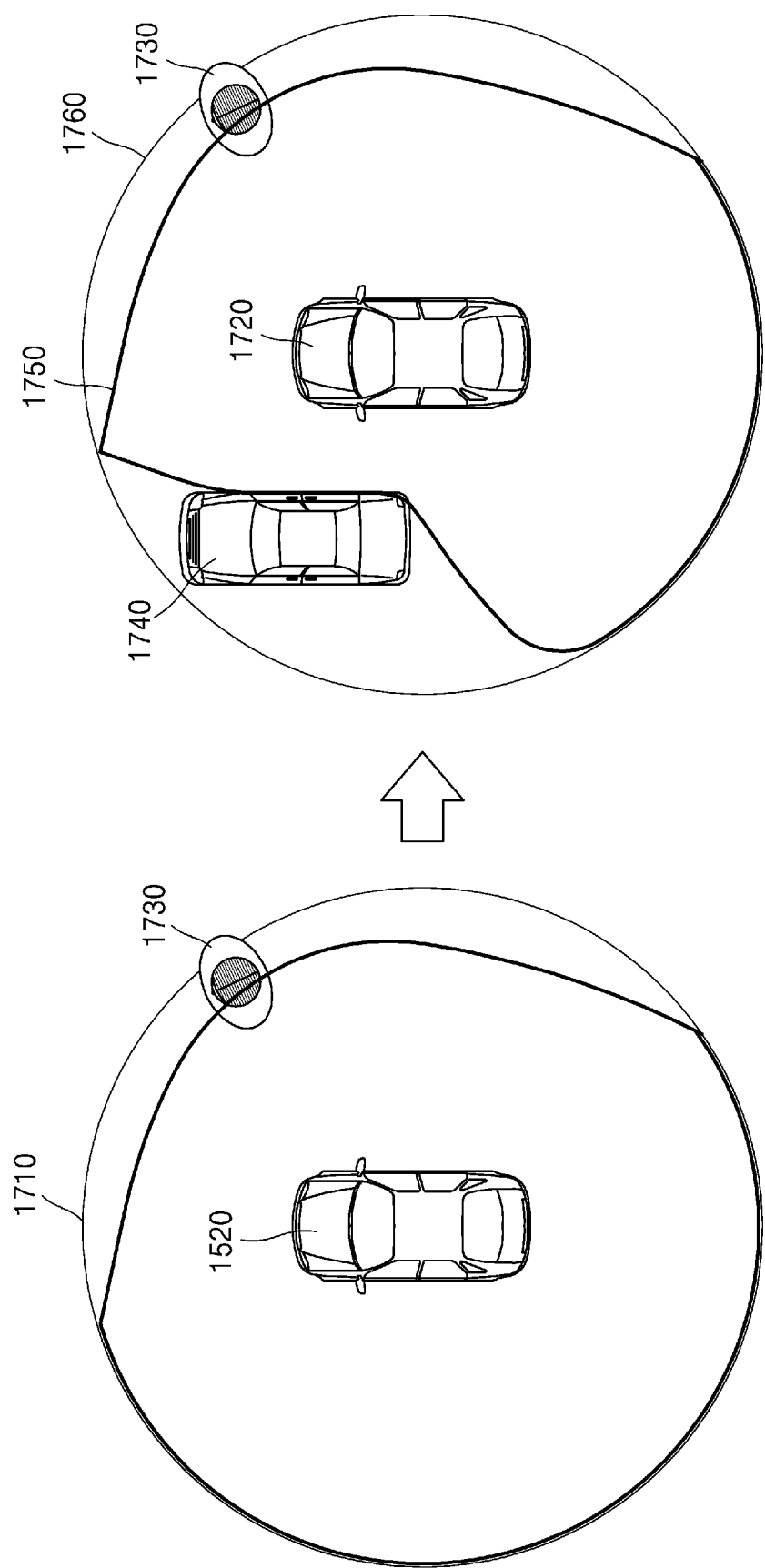
FIG. 17 is a diagram for describing an example in which a processor according to an embodiment changes an aspect ratio of a mesh based on a plurality of objects.

FIG. 17 is a diagram for describing an example in which a processor according to an embodiment changes an aspect ratio of a mesh based on a plurality of objects.

FIG. 17 shows an example of a mesh 1710 viewed from above. As described above in relation to FIG. 16, the mesh 1710 may have a cylindrical shape, a conical shape, or a combination of cylindrical and conical shapes. Therefore, when viewed from above, the mesh 1710 may have a circular shape. It is assumed that a vehicle 1720 is located at the center of the mesh 1710.

When an object 1730 is located near the vehicle 1720, the processor may change an aspect ratio of the mesh 1710 as described above in relation to FIG. 16. When another object 1740 is located near the vehicle 1720, the processor may additionally change the aspect ratio of the mesh 1710 in such a manner that the object 1740 is located at the edge of the mesh 1710. Therefore, even when a plurality of objects 1730 and 1740 are located near the vehicle 1720, the processor may generate a mesh 1750 on which the objects 1730 and 1740 may be expressed without distortion.

The processor may store the newly generated mesh 1750 in memory.

FIG. 18 is a flowchart of another example of a method of generating an image, according to an embodiment.

Referring to FIG. 18, the method of generating the image includes operations performed by a processor in a time-series manner as described above in relation to FIGS. 1 to 17. Therefore, although not provided below, the descriptions of the processor provided above in relation to FIGS. 1 to 17 may also be applied to the method of FIG. 18.

Operations 1810 to 1830 of FIG. 18 are the same as operations 310 to 330 of FIG. 3. Therefore, detailed descriptions of operations 1810 to 1830 will not be provided herein.

In operation 1840, the processor displays a generated image on a vehicle.

For example, when a user input for changing the image is received, the processor may display an image from which at least one of a vehicle and objects shown on the image is excluded. When a user input is received, the processor may display a bird view image or a 3D image. Examples of the image displayed on the vehicle will be described below with reference to FIGS. 20A to 20C.

The processor may output the generated image (e.g., the 3D image) on at least one of a head-up display, a mirror display, and a center information display included in the vehicle. Examples of a display device on which the processor outputs an image will now be described with reference to FIGS. 19A to 19C.

Figure 19A:
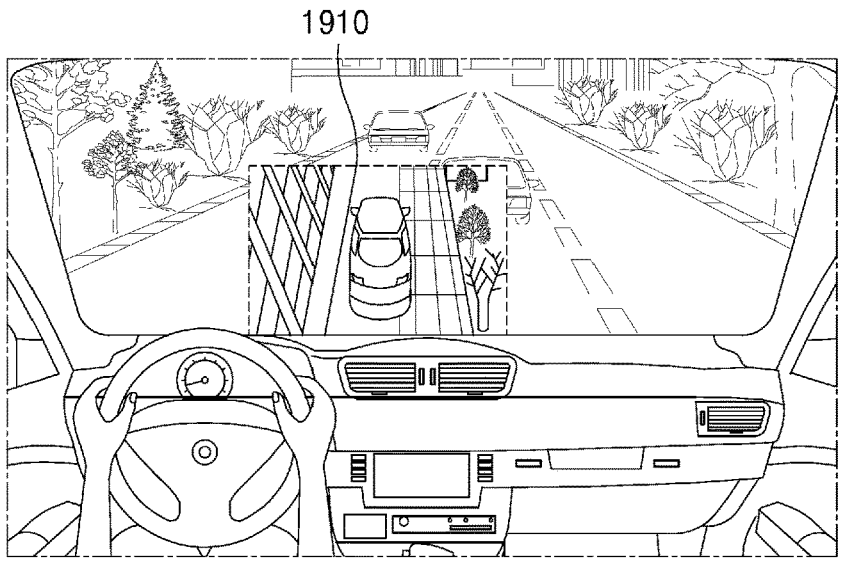
FIGS. 19A to 19C are images for describing examples of a display device on which an image according to an embodiment is output.
Figure 19B:
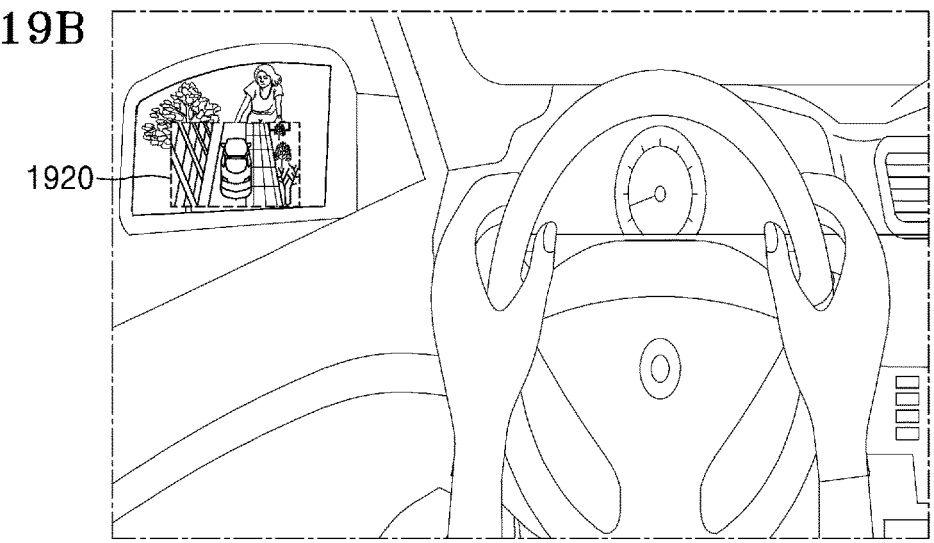
Figure 19C:
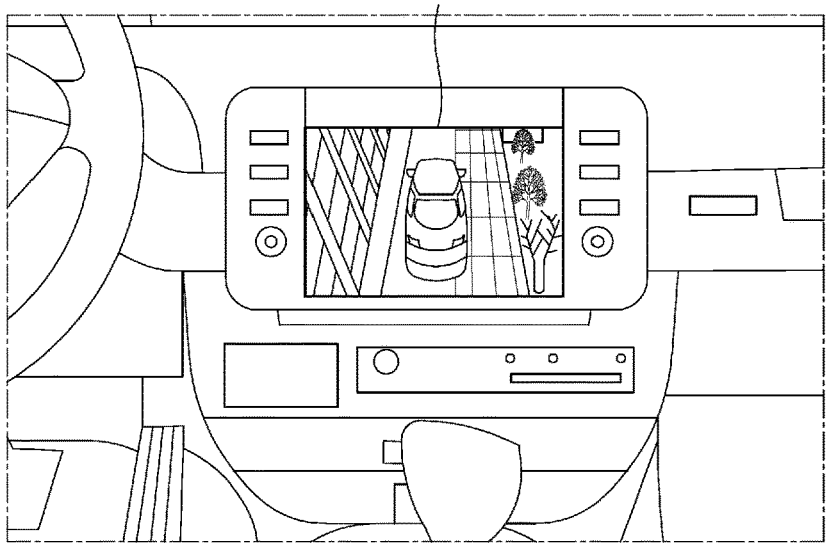

FIGS. 19A to 19C are images for describing examples of a display device on which an image according to an embodiment is output.

Referring to FIGS. 19A to 19C, a processor may display a 3D image 1910 on a vehicle. As an example, the processor may display the 3D image 1910 on a window of the vehicle by using a head-up display device. As another example, the processor may display a 3D image 1920 on a side mirror of the vehicle by using a mirror display device. As another example, the processor may display a 3D image 1930 on a screen of a center information display device of the vehicle (or a display device connected to a driver assistance apparatus in a wired or wireless manner).

FIGS. 20A to 20D are images for describing examples of an image displayed according to an embodiment.

When a user input is received, a processor may change an image displayed on a display device 2100. Herein, the display device 2100 may be a driver assistance apparatus 2000 illustrated in FIGS. 21 and 22. For example, an indicator 2110, e.g., an icon, for changing the image may be displayed on a screen of the display device 2100. When a user input for selecting the indicator 2110 is received, the processor may change the image displayed on the display device 2100.

As an example, referring to FIG. 20A or 20C, the processor may display a 3D image 2210 or 2230 based on the user input. Specifically, the processor may display the 3D image 2210 including a vehicle and objects, or the 3D image 2230 including only the objects.

As another example, referring to FIG. 20B or 20D, the processor may display a bird view image 2220 or 2240 based on the user input. Specifically, the processor may display the bird view image 2220 including the vehicle and the objects, or the bird view image 2240 including only the objects.

Figure 21:
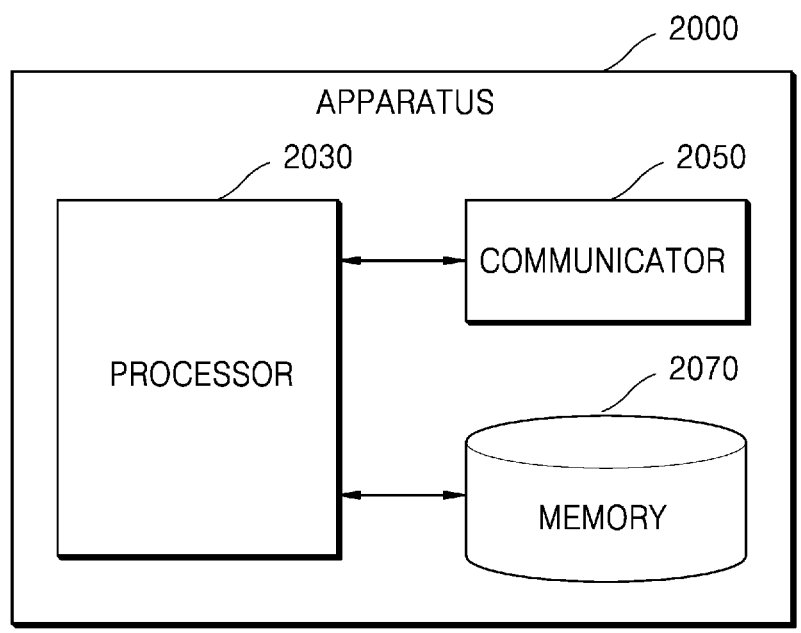

FIGS. 21 and 22 are block diagrams of examples of a driver assistance apparatus including a processor according to an embodiment.

Referring to FIG. 20, a driver assistance apparatus 2000 includes a processor 2030, a memory 2070, and a communicator 2050.

However, not all elements illustrated in FIG. 20 are essential elements of the driver assistance apparatus 2000. The driver assistance apparatus 2000 may include a larger or smaller number of elements compared to those illustrated in FIG. 20.

For example, as illustrated in FIG. 21, the driver assistance apparatus 2000 may further include a user inputter 2010, an outputter 2020, a sensor 2040, and a driving system 2060 in addition to the processor 2030, the memory 2070, and the communicator 2050.

The user inputter 2010 refers to a means by which a user inputs data for controlling the apparatus 2000. For example, the user inputter 2010 may include a key pad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto.

The user inputter 2010 may receive a user input for requesting a response message to a voice input of the user and executing an operation related to the response message.

The outputter 2020 may output an audio signal, a video signal, or a vibration signal. The outputter 2020 may include at least one of a display 2021, a sound outputter 2021, and a vibration motor 2023, but is not limited thereto.

The display 2021 displays information processed by the apparatus 2000. For example, the display 2021 may display a user interface for requesting a response message to a voice input of the user and executing an operation related to the response message. The display 2021 may display a 3D image of a surrounding area of a vehicle.

The sound outputter 2021 outputs audio data received from the communicator 2050 or stored in the memory 2070. The sound outputter 2021 outputs a sound signal related to a function performed by the apparatus 2000 (e.g., call signal reception sound, message reception sound, or notification sound).

The processor 2030 generally controls overall operations of the apparatus 2000. For example, the processor 2030 may generally control the user inputter 2010, the outputter 2020, the sensor 2040, the communicator 2050, and the driving system 2060 by executing programs stored in the memory 2070. The processor 2030 may perform the functions described above in relation to FIGS. 1 to 19, by executing programs stored in the memory 2070. For example, the processor 2030 may be a microcontroller unit (MCU). The processor 2030 may be a cognitive processor.

For example, the processor 2030 may detect at least one object near the vehicle by using a result of photographing a surrounding area of the vehicle. The processor 2030 may determine a mesh to be applied to an image including the object, by using location information of the detected object. The processor 2030 may generate an image (e.g., a 3D image) of the surrounding area of the vehicle by using the determined mesh.

The processor 2030 may calculate a distance from the vehicle to the object and an azimuth of the object with respect to the vehicle.

The processor 2030 may cut off a part of a prestored mesh based on the location of the object. The processor 2030 may select one of a plurality of meshes prestored in the memory 2070, based on the location of the object. The processor 2030 may change an aspect ratio of a part of a prestored mesh based on the location of the object.

The processor 2030 may display the image (e.g., the 3D image) of the surrounding area of the vehicle on the display 2021.

The sensor 2040 may sense a status of the apparatus 2000 and transmit the sensed information to the processor 2030. The sensor 2040 may be used to obtain or generate context information indicating a surrounding situation of the user of the vehicle (e.g., whether an object is present nearby).

The sensor 2040 may include at least one of a global positioning system (GPS) module 2041, an inertial measurement unit (IMU) 2042, a radar module 2043, a lidar module 2044, an image sensor 2045, an environmental sensor 2046, a proximity sensor 2047, an RGB sensor (or an illuminance sensor) 2048, and a motion sensor 2049, but is not limited thereto. Functions of the elements of the sensor 2040 may be intuitively inferred from their names by one of ordinary skill in the art, and thus detailed descriptions thereof will not be provided herein.

The IMU 2042 may be used to sense location and orientation variations of the vehicle based on inertial acceleration. For example, the IMU 2042 may include accelerometers and gyroscopes.

The radar module 2043 may be used to sense objects in the surrounding area of the vehicle by using radio signals. The radar module 2043 may sense speeds and/or directions of the objects.

The lidar module 2044 may be used to sense objects in the surrounding area of the vehicle by using laser beams. Specifically, the lidar module 2044 may include a laser light source and/or a laser scanner configured to emit laser beams, and a detector configured to detect reflected laser beams. The lidar module 2044 may be configured to operate in a coherent (for example, using heterodyne detection) or incoherent detection mode.

The image sensor 2045 may include a camera used to generate images of the inside or outside of the vehicle. For example, the camera may include a mono camera, a stereo camera, an infrared camera, or a thermal camera, but is not limited thereto. The image sensor 2045 may include a plurality of cameras, and the plurality of cameras may be provided at a plurality of locations inside and outside the vehicle.

The environmental sensor 2046 may be used to sense an external environment of the vehicle, e.g., a weather. For example, the environmental sensor 2046 may include temperature/humidity sensor 20461, an infrared sensor 20462, and a barometric pressure sensor 20463.

The proximity sensor 2047 may be used to sense an object approaching the vehicle.

The motion sensor 2049 may be used to sense motion of the vehicle. For example, the motion sensor 2049 may include a magnetic sensor 20491, an acceleration sensor 20492, and a gyroscope sensor 20493.

The communicator 2050 may include one or more elements for enabling the apparatus 2000 to communicate with another apparatus of the vehicle, an external device, or an external server. The external device may include a computing device or a sensing device, but is not limited thereto. For example, the communicator 2050 may include at least one of a short-range wireless communicator 2051, a mobile communicator 2052, and a broadcast receiver 2053, but is not limited thereto.

The short-range wireless communicator 2051 may include, for example, a Bluetooth communicator, a Bluetooth low energy (BLE) communicator, a near field communicator, a WLAN (or Wi-Fi) communicator, a Zigbee communicator, an infrared data association (IrDA) communicator, a Wi-Fi direct (WFD) communicator, or an ultra-wideband (UWB) communicator, but is not limited thereto.

The mobile communicator 2052 transmits and receives radio signals to and from at least one of a base station, an external user device, and a server in a mobile communication network. Herein, the radio signals may include various types of data based on transmission and reception of voice call signals, video call signals, and text/multimedia messages.

The communicator 2050 may transmit and receive, to and from the external device and the external server, information required to request a response message to a voice input of the user and execute an operation related to the response message.

The driving system 2060 may include elements used to drive the vehicle and to operate other apparatuses in the vehicle. The driving system 2060 may include at least one of a power supply 2061, a propulsion system 2062, a moving system 2063, and peripheral devices 2064, but is not limited thereto.

The power supply 2061 may be configured to provide power to some or all of the elements of the vehicle. For example, the power supply 2061 may include a rechargeable lithium ion or lead-acid battery.

The propulsion system 2062 may include an engine/motor, an energy source, a transmission, and wheels/tires.

The engine/motor may include an arbitrary combination of an internal combustion engine, an electric motor, a steam engine, and a Stirling engine. For example, when the vehicle is a gas-electric hybrid car, the engine/motor may include a gasoline engine and an electric motor.

The peripheral devices 2064 may include, for example, a navigation system, headlamps, direction indicators, windshield wipers, interior lights, a heater, and an air conditioner.

Herein, the navigation system may be a system configured to determine a driving route of the vehicle. The navigation system may be configured to dynamically update the driving route while the vehicle is being driven. For example, the navigation system may use data collected by the GPS module 2041, to determine the driving route of the vehicle.

The memory 2070 may store programs for processing and control operations of the processor 2030, and store data to be transmitted to or received from the external device or the external server.

The memory 2070 may include at least one of flash memory, a hard disk, a multimedia card micro, card-type memory (e.g., secure digital (SD) or extreme digital (XD) memory), random access memory (RAM), static RAM (SRAM), read-only memory (ROM), electrically erasable programmable ROM (EEPROM), programmable ROM (PROM), magnetic memory, a magnetic disc, and an optical disc.

The programs stored in the memory 2070 may be classified into a plurality of modules based on functions thereof. For example, the memory 2070 may include at least one of a user interface (UI) module 2071, a touchscreen module 2072, and a notification module 2073, but is not limited thereto.

The UI module 2071 may provide a UI or graphical user interface (GUI) specialized for each application and associated with the apparatus 2000. The touchscreen module 2072 may sense a touch gesture of the user on a touchscreen and transmit information about the touch gesture to the processor 2030. The touchscreen module 2072 according to some embodiments may recognize and analyze touch code. The touchscreen module 2072 may be configured as separate hardware including a controller.

As described above, a processor may modify a 3D mesh based on an actual location of an object near a vehicle. Alternatively, the processor may select an appropriate 3D mesh from among prestored 3D meshes based on the actual location of the object near the vehicle. Therefore, a shape of the object and a relative location between the vehicle and the object may be accurately expressed on a 3D image displayed on the vehicle.

The above-described method may be written as a computer-executable program, and be implemented in a general-purpose digital computer that executes the program using a computer-readable recording medium. A data structure used in the above-described method may be recorded in the computer-readable recording medium through various means. Examples of the computer-readable recording medium include magnetic storage media (e.g., read-only-memory (ROM), random-access memory (RAM), floppy disks, and hard disks) and optical recording media (e.g., compact disc-ROM (CD-ROM) and digital versatile discs (DVDs)).

The above-described method may be performed by executing instructions included in at least one of programs maintained in the computer-readable recording medium. When the instructions are executed by a computer, the at least one computer may perform functions corresponding to the instructions. Herein, the instructions include high-level language code executable by a computer using an interpreter, as well as machine language code, for example, created by a compiler. In the present disclosure, an example of the computer may be a processor, and an example of the recording medium may be memory.

It will be understood by one of ordinary skill in the art that various changes in form and details may be made in the afore-described embodiments without departing from the scope of the disclosure. Therefore, the disclosed methods should be considered in a descriptive sense only and not for purposes of limitation. The scope of the disclosure is defined not by the detailed description of the disclosure but by the following claims, and all differences within the scope will be construed as being included in the present disclosure.

The invention claimed is:

1. An apparatus for generating an image, the apparatus comprising a processor configured to:
   detect at least one object near a vehicle by using a result of sensing a surrounding area of the vehicle,
   determine a direction and a distance to the detected at least one object,
   obtain a mesh based on the determined direction and distance such that the at least one object is located on an edge of the mesh, and
   obtain an image of the surrounding area of the vehicle based on the obtained mesh.

2. The apparatus of claim 1, wherein the processor is further configured to:
   cut off a part of a prestored mesh based on the determined direction and distance.

3. The apparatus of claim 1, wherein the processor is further configured to:
   select one of a plurality of prestored meshes based on the determined direction and distance.

4. The apparatus of claim 1, wherein the processor is further configured to:
   change an aspect ratio of a part of a prestored mesh based on the determined direction and distance.

5. The apparatus of claim 1, wherein the processor is further configured to:
   detect the at least one object by using information received from at least one of a camera and a radar device included in the vehicle.

6. The apparatus of claim 1, wherein the processor is further configured to:
   transmit the obtained image to a display device included in the vehicle.

7. The apparatus of claim 1, wherein the processor is further configured to:
   transmit an image obtained by excluding at least one of the vehicle and the at least one object from the obtained image to a display device included in the vehicle when a user input for selecting a view point of an image is received.

8. The apparatus of claim 1, further comprising a memory storing the obtained mesh.

9. A method of generating an image, the method comprising:
   detecting at least one object near a vehicle by using a result of sensing a surrounding area of the vehicle;
   determining a direction and a distance from the vehicle to the detected at least one object;
   obtaining a mesh based on the determined direction and distance such that the at least one object is located on an edge of the mesh: and
   obtaining an image of the surrounding area of the vehicle based on the mesh.

10. The method of claim 9, further comprising:
cutting off a part of a prestored mesh based on the determined direction and distance, and
generating the image based on the cut mesh.

11. The method of claim 9, further comprising:
selecting one of a plurality of prestored meshes based on the determined direction and distance, and
obtaining the image based on the selected mesh.

12. The method of claim 9, further comprising:
changing an aspect ratio of a part of a prestored mesh based on the determined direction and distance, and
obtaining the image based on the changed mesh.

13. The method of claim 9, further comprising:
detecting the at least one object by using information received from at least one of a camera and a radar device included in the vehicle.

* * * * *